United States Patent
Kaucky et al.

(10) Patent No.: US 9,475,019 B2
(45) Date of Patent: Oct. 25, 2016

(54) SYSTEMS AND METHODS FOR COMPOUNDING A PREPARATION USING A PREMIX SOLUTION

(71) Applicant: Baxter Corporation Englewood, Englewood, CO (US)

(72) Inventors: Dennis Kaucky, Chicago, IL (US); Dennis A. Tribble, Ormond Beach, FL (US)

(73) Assignee: Baxter Corporation Englewood, Englewood, CO (US)

( * ) Notice: Subject to any disclaimer, the term of this patent is extended or adjusted under 35 U.S.C. 154(b) by 0 days.

(21) Appl. No.: 14/774,502

(22) PCT Filed: Mar. 14, 2014

(86) PCT No.: PCT/US2014/027360
§ 371 (c)(1),
(2) Date: Sep. 10, 2015

(87) PCT Pub. No.: WO2014/152457
PCT Pub. Date: Sep. 25, 2014

(65) Prior Publication Data
US 2016/0045876 A1 Feb. 18, 2016

Related U.S. Application Data

(60) Provisional application No. 61/763,652, filed on Mar. 15, 2013.

(51) Int. Cl.
*B01F 15/02* (2006.01)
*A61J 1/22* (2006.01)
(Continued)

(52) U.S. Cl.
CPC .......... *B01F 15/00311* (2013.01); *A61J 3/002* (2013.01); *B01F 15/0245* (2013.01); *G05D 11/133* (2013.01); *B01F 13/1066* (2013.01); *B01F 2215/0032* (2013.01)

(58) Field of Classification Search
CPC ................ A61J 3/002; B01F 13/1066; B01F 15/00311; B01F 15/0245; B01F 2215/0032; G05D 11/133
See application file for complete search history.

(56) References Cited

U.S. PATENT DOCUMENTS 4,625,494 A * 12/1986 Iwatschenko ........... A61J 3/002
53/432
4,871,262 A * 10/1989 Krauss ................ B01F 13/1055
222/135

(Continued)

FOREIGN PATENT DOCUMENTS

EP 1997471 12/2008
EP 2457550 5/2012

*Primary Examiner* — Tony G Soohoo
(74) *Attorney, Agent, or Firm* — Marsh Fischmann & Breyfogle LLP

(57) ABSTRACT

Computer systems and non-transitory computer readable media for determining an amount of an ingredient for a preparation for a requested therapy (e.g., an order or a prescription) includes an identifier, volume, and amounts of first and second compounds in each of a plurality of premix solutions. A predefined formulary comprising a formulary concentration of each of a plurality of additions is provided. A premix solution is selected. An amount of a first additions to be added to the premix solution may be selected. A number of bags of the premix solution, needed to satisfy a volume associated with the selected premix solution, are optionally reserved. An additive volume is determined at least by the specified first amounts of the first addition and a corresponding formulary concentration.

24 Claims, 19 Drawing Sheets

(51) Int. Cl.
  *B01F 15/00* (2006.01)
  *G05D 11/13* (2006.01)
  *A61J 3/00* (2006.01)
  *B01F 13/10* (2006.01)

(56) References Cited

U.S. PATENT DOCUMENTS

| | | | | |
|---|---|---|---|---|
| 5,247,957 A * | 9/1993 | Weisse | ............... | F16N 27/00 137/101.21 |
| 5,479,969 A * | 1/1996 | Hardie | ............... | B65B 3/003 141/103 |
| 5,911,252 A * | 6/1999 | Cassel | ............... | B65B 3/003 141/234 |
| 7,017,623 B2 * | 3/2006 | Tribble | ............... | G09F 3/02 141/104 |
| 8,596,309 B2 * | 12/2013 | Mizuno | ............... | A61J 3/002 141/104 |
| 9,221,045 B2 * | 12/2015 | Yoshida | ............... | B25J 9/0018 |
| 2001/0009994 A1 * | 7/2001 | Small | ............... | A61J 3/002 604/513 |
| 2001/0047309 A1 * | 11/2001 | Bartholomew | ............... | A45D 29/00 700/233 |
| 2002/0035412 A1 * | 3/2002 | Kircher | ............... | B01F 13/1063 700/239 |
| 2003/0062379 A1 * | 4/2003 | Bartholomew | ............... | A45D 44/00 222/1 |
| 2005/0278066 A1 * | 12/2005 | Graves | ............... | G21F 5/015 700/239 |
| 2016/0045876 A1 * | 2/2016 | Kaucky | ............... | A61J 3/002 366/162.1 |

* cited by examiner

FIG. 1A
(PRIOR ART)

| HOW SUPPLIED | | | CONTENTS OF ADMIXED PRODUCT COMPOSITION | | | ESSENTIAL AMINO ACIDS (mg/100 mL) | | | | | | | | | NONESSENTIAL AMINO ACIDS (mg/100 mL) | | | | | ANION PROFILE (mEq/L)² | |
|---|---|---|---|---|---|---|---|---|---|---|---|---|---|---|---|---|---|---|---|---|---|
| AFTER MIXING, THE PRODUCT REPRESENTS | 1000 mL CODE AND NDC NUMBER | 2000 mL CODE AND NDC NUMBER | DEXTROSE HYDROUS, USP¹ (g/100mL) | AMINO ACIDS (g/100mL) | TOTAL NITROGEN (mg/100mL) | LEUCINE -(CH₃)₂ CHCH₂CH (NH₂) COOH | ISOLEUCINE - CH₃CH₂CH (CH₃) CH (NH₂) COOH | VALINE - (CH₃)₂ CHCH (NH₂) COOH | LYSINE (ADDED AS THE HYDROCHLORIDE SALT) - H₂N (CH₂)₄ CH (NH₂) COOH | PHENYLALANINE - (C₆H₅) CH₂ CH (NH₂) COOH | HISTIDINE - (C₃H₃N₂) CH₂CH (NH₂) COOH | THREONINE - CH₃CH (OH) CH (NH₂) COOH | METHIONINE - CH₃S (CH₂)₂ CH (NH₂) COOH | TRYPTOPHAN - (C₈H₆N) CH₂ CH (NH₂) COOH | ALANINE - CH₃CH (NH₂) COOH | ARGININE - H₂N C (NH) NH (CH₂)₃ CH (NH₂) COOH | GLYCINE - H₂NCH₂COOH | PROLINE - [(CH₂)₃ NH CH] COOH | SERINE - HOCH₂CH (NH₂) COOH | TYROSINE - (C₆H₄ (OH) CH₂CH (NH₂) COOH) | ACETATE³ | CHLORIDE⁴ |
| CLINIMIX 2.75/5 SULFITE-FREE 2.75% AMINO ACID IN 5% DEXTROSE INJECTION | CODE 2B7725 NDC 0338-1132-03 | CODE 2B7701 NDC 0338-1083-04 | 5 | 2.75 | 454 | 201 | 165 | 160 | 159 | 154 | 132 | 116 | 110 | 50 | 570 | 316 | 263 | 197 | 139 | 11 | 24 | 11 |
| CLINIMIX 4.25/5 SULFITE-FREE 4.25% AMINO ACID IN 5% DEXTROSE INJECTION | CODE 2B7726 NDC 0338-1133-03 | CODE 2B7704 NDC 0338-1089-04 | 5 | 4.25 | 702 | 311 | 255 | 247 | 247 | 238 | 204 | 179 | 170 | 77 | 880 | 489 | 438 | 299 | 213 | 17 | 37 | 17 |
| CLINIMIX 4.25/10 SULFITE-FREE 4.25% AMINO ACID IN 10% DEXTROSE INJECTION | CODE 2B7727 NDC 0338-1134-03 | CODE 2B7705 NDC 0338-1091-04 | 10 | 4.25 | 702 | 311 | 255 | 247 | 247 | 238 | 204 | 179 | 170 | 77 | 880 | 489 | 438 | 299 | 213 | 17 | 37 | 17 |
| CLINIMIX 4.25/20 SULFITE-FREE 4.25% AMINO ACID IN 20% DEXTROSE INJECTION | CODE 2B7728 NDC 0338-1135-03 | CODE 2B7706 NDC 0338-1093-04 | 20 | 4.25 | 702 | 311 | 255 | 247 | 247 | 238 | 204 | 179 | 170 | 77 | 880 | 489 | 438 | 299 | 213 | 17 | 37 | 17 |
| CLINIMIX 4.25/25 SULFITE-FREE 4.25% AMINO ACID IN 25% DEXTROSE INJECTION | CODE 2B7729 NDC 0338-1136-03 | CODE 2B7707 NDC 0338-1095-04 | 25 | 4.25 | 702 | 311 | 255 | 247 | 247 | 238 | 204 | 179 | 170 | 77 | 880 | 489 | 438 | 299 | 213 | 17 | 37 | 17 |
| CLINIMIX 5/15 SULFITE-FREE 5% AMINO ACID IN 15% DEXTROSE INJECTION | CODE 2B7730 NDC 0338-1137-03 | CODE 2B7709 NDC 0338-1099-04 | 15 | 5 | 826 | 365 | 300 | 290 | 290 | 280 | 240 | 210 | 200 | 90 | 1035 | 575 | 515 | 340 | 250 | 20 | 42 | 20 |
| CLINIMIX 5/20 SULFITE-FREE 5% AMINO ACID IN 20% DEXTROSE INJECTION | CODE 2B7731 NDC 0338-1138-03 | CODE 2B7710 NDC 0338-1101-04 | 20 | 5 | 826 | 365 | 300 | 290 | 290 | 280 | 240 | 210 | 200 | 90 | 1035 | 575 | 515 | 340 | 250 | 20 | 42 | 20 |
| CLINIMIX 5/25 SULFITE-FREE 5% AMINO ACID IN 25% DEXTROSE INJECTION | CODE 2B7732 NDC 0338-1139-03 | CODE 2B7711 NDC 0338-1103-04 | 25 | 5 | 826 | 365 | 300 | 290 | 290 | 280 | 240 | 210 | 200 | 90 | 1035 | 575 | 515 | 340 | 250 | 20 | 42 | 20 |

FIG. 1B (PRIOR ART)

CONTENTS OF ADMIXED PRODUCT

| HOW SUPPLIED | | | COMPOSITION | | ESSENTIAL AMINO ACIDS (mg/100 mL) | | | | | | | | | | NONESSENTIAL AMINO ACIDS (mg/100 mL) | | | | | | ELECTROLYTES (mg/100 mL) | | | | |
|---|---|---|---|---|---|---|---|---|---|---|---|---|---|---|---|---|---|---|---|---|---|---|---|---|---|
| AFTER MIXING, THE PRODUCT REPRESENTS | 1000 mL CODE AND NDC NUMBER | 2000 mL CODE AND NDC NUMBER | DEXTROSE HYDROUS, USP¹ (g/100mL) | AMINO ACIDS (g/100mL) | TOTAL NITROGEN (mg/100mL) | LEUCINE - (CH₃)₂ CHCH₂CH(NH₂) COOH | ISOLEUCINE - CH₃CH₂CH(CH₃) CH(NH₂) COOH | VALINE - (CH₃)₂ CHCH(NH₂) COOH | LYSINE (ADDED AS THE HYDROCHLORIDE SALT) - H₂N (CH₂)₄ CH (NH₂) COOH | PHENYLALANINE - (C₆H₅) CH₂ CH (NH₂) COOH | HISTIDINE - (C₃H₃N₂) CH₂CH(NH₂) COOH | THREONINE - CH₃CH(OH) CH (NH₂) COOH | METHIONINE - CH₃S (CH₂)₂ CH (NH₂) COOH | TRYPTOPHAN - (C₈H₆N) CH₂ CH (NH₂) COOH | ALANINE - CH₃CH(NH₂) COOH | ARGININE - H₂N C(NH) NH (CH₂)₃ CH (NH₂) COOH | GLYCINE - H₂NCH₂COOH | PROLINE - [(CH₂)₃ NH CH] COOH | SERINE - HOCH₂CH (NH₂) COOH | TYROSINE - (C₆H₄ (OH)) CH₂CH (NH₂) COOH | SODIUM ACETATE TRIHYDRATE, USP - C₂H₃NaO₂·3H₂O | DIBASIC POTASSIUM PHOSPHATE, USP - K₂HPO₄ | SODIUM CHLORIDE, USP - NaCl | MAGNESIUM CHLORIDE, USP - MgCl₂·6H₂O | CALCIUM CHLORIDE DIHYDRATE, USP - CaCl₂·2H₂O |
| CLINIMIX E 2.75/5 SULFITE-FREE (2.75% AMINO ACID WITH ELECTROLYTES IN 5% DEXTROSE WITH CALCIUM) INJECTION | CODE 2B7735 NDC 0338-1142-03 | CODE 2B7713 NDC 0338-1109-04 | 5 | 2.75 | 464 | 201 | 165 | 180 | 159 | 154 | 132 | 116 | 110 | 50 | 570 | 316 | 283 | 187/139 | 139 | 11 | 217 | 261 | 112 | 51 | 33 |
| CLINIMIX E 2.75/10 SULFITE-FREE (2.75% AMINO ACID WITH ELECTROLYTES IN 10% DEXTROSE WITH CALCIUM) INJECTION | CODE 2B7736 NDC 0338-1143-03 | CODE 2B7714 NDC 0338-1109-04 | 10 | 2.75 | 464 | 201 | 165 | 180 | 159 | 154 | 132 | 116 | 110 | 50 | 570 | 316 | 283 | 187/139 | 139 | 11 | 217 | 261 | 112 | 51 | 33 |
| CLINIMIX E 4.25/5 SULFITE-FREE (4.25% AMINO ACID WITH ELECTROLYTES IN 5% DEXTROSE WITH CALCIUM) INJECTION | CODE 2B7737 NDC 0338-1144-03 | CODE 2B7716 NDC 0338-1113-04 | 5 | 4.25 | 702 | 311 | 255 | 247 | 247 | 238 | 204 | 179 | 170 | 77 | 880 | 489 | 438 | 289/213 | 213 | 17 | 297 | 261 | 77 | 51 | 33 |
| CLINIMIX E 4.25/10 SULFITE-FREE (4.25% AMINO ACID WITH ELECTROLYTES IN 10% DEXTROSE WITH CALCIUM) INJECTION | CODE 2B7738 NDC 0338-1145-03 | CODE 2B7717 NDC 0338-1115-04 | 10 | 4.25 | 702 | 311 | 255 | 247 | 247 | 238 | 204 | 179 | 170 | 77 | 880 | 489 | 438 | 289/213 | 213 | 17 | 297 | 261 | 77 | 51 | 33 |
| CLINIMIX E 4.25/25 SULFITE-FREE (4.25% AMINO ACID WITH ELECTROLYTES IN 25% DEXTROSE WITH CALCIUM) INJECTION | CODE 2B7739 NDC 0338-1146-03 | CODE 2B7719 NDC 0338-1119-04 | 25 | 4.25 | 702 | 311 | 255 | 247 | 247 | 238 | 204 | 179 | 170 | 77 | 880 | 489 | 438 | 289/213 | 213 | 17 | 297 | 261 | 77 | 51 | 33 |
| CLINIMIX E 5/15 SULFITE-FREE (5% AMINO ACID WITH ELECTROLYTES IN 15% DEXTROSE WITH CALCIUM) INJECTION | CODE 2B7740 NDC 0338-1147-03 | CODE 2B7721 NDC 0338-1123-04 | 15 | 5 | 828 | 365 | 300 | 290 | 290 | 280 | 240 | 210 | 200 | 90 | 1035 | 575 | 515 | 340/250 | 250 | 20 | 340 | 261 | 59 | 51 | 33 |
| CLINIMIX E 5/20 SULFITE-FREE (5% AMINO ACID WITH ELECTROLYTES IN 20% DEXTROSE WITH CALCIUM) INJECTION | CODE 2B7741 NDC 0338-1148-03 | CODE 2B7722 NDC 0338-1125-04 | 20 | 5 | 828 | 365 | 300 | 290 | 290 | 280 | 240 | 210 | 200 | 90 | 1035 | 575 | 515 | 340/250 | 250 | 20 | 340 | 261 | 59 | 51 | 33 |
| CLINIMIX E 5/25 SULFITE-FREE (5% AMINO ACID WITH ELECTROLYTES IN 25% DEXTROSE WITH CALCIUM) INJECTION | CODE 2B7742 NDC 0338-1149-03 | CODE 2B7723 NDC 0338-1127-04 | 25 | 5 | 828 | 365 | 300 | 290 | 290 | 280 | 240 | 210 | 200 | 90 | 1035 | 575 | 515 | 340/250 | 250 | 20 | 340 | 261 | 59 | 51 | 33 |

| PRESCRIPTION 1 | ~72-1 |
| PREMIX SOLUTION IDENTIFIER | ~50-X |
| AMOUNT OF PREMIX SOLUTION | ~204 |
| IDENTIFIER OF ADDITION 1 | ~58-X |
| AMOUNT OF ADDITION 1 | ~206-1 |
| IDENTIFIER OF ADDITION 2 | ~58-Y |
| AMOUNT OF ADDITION 2 | ~206-2 |
| ⋮ | |
| IDENTIFIER OF ADDITION Q | ~58-Q |
| AMOUNT OF ADDITION Q | ~206-Q |

FIG.4A

| MANIFEST 1 | ~74-1 |
| BAG TYPE | ~64 |
| NUMBER OF BAGS | ~210 |
| OPTIONAL BAG DRAWDOWN VOLUME | ~212 |
| IDENTIFIER OF ADDITION 1 | ~58-X |
| ALIQUOT VOLUME FOR ADDITION 1 | ~214-X |
| IDENTIFIER OF ADDITION 2 | ~58-Y |
| ALIQUOT VOLUME FOR ADDITION 2 | ~214-Y |
| ⋮ | |
| IDENTIFIER OF ADDITION Q | ~58-Q |
| ALIQUOT VOLUME FOR ADDITION Q | ~214-Q |
| BAG OVERLABEL | ~216 |
| ⋮ | |

FIG.4B

| | |
|---|---|
| MANIFEST 1 | 74-1 |
| BAG TYPE | 64 |
| NUMBER OF BAGS | 210 |
| OPTIONAL BAG DRAWDOWN VOLUME FOR BAG 1 | 212-1 |
| ⋮ | |
| OPTIONAL BAG DRAWDOWN VOLUME FOR BAG N | 212-N |
| IDENTIFIER OF ADDITION 1 | 58-X |
| ALIQUOT VOLUME FOR ADDITION 1 FOR BAG 1 | 214-X-1 |
| ⋮ | |
| ALIQUOT VOLUME FOR ADDITION 1 FOR BAG N | 214-X-N |
| IDENTIFIER OF ADDITION 2 | 58-Y |
| ALIQUOT VOLUME FOR ADDITION 2 | 214-Y-1 |
| ⋮ | |
| ALIQUOT VOLUME FOR ADDITION 2 FOR BAG N | 214-Y-N |
| ⋮ | |
| IDENTIFIER OF ADDITION Q | 58-Q |
| ALIQUOT VOLUME FOR ADDITION Q | 214-Q-1 |
| ⋮ | |
| ALIQUOT VOLUME FOR ADDITION Q FOR BAG N | 214-Q-N |
| BAG OVERLABEL FOR BAG 1 | 216-1 |
| ⋮ | |
| BAG OVERLABEL FOR BAG N | 216-N |

Table (top section):

| ID | VOLUME (ml) | AA (g) | DEX (g) | AA (Kcal) | DEX (Kcal) | TOTAL (KCAL) |
|---|---|---|---|---|---|---|
| 21 | 100 | 5 | 15 | 20 | 51 | 71 |
| 22 | 200 | 10 | 30 | 40 | 102 | 142 |
| 23 | 300 | 15 | 45 | 60 | 153 | 213 |
| 24 | 400 | 20 | 60 | 80 | 204 | 284 |
| 28 | 800 | 40 | 120 | 160 | 408 | 568 |
| 29 | 900 | 45 | 135 | 180 | 459 | 639 |
| 30 | 1000 | 50 | 150 | 200 | 510 | 710 |
| 31 | 1100 | 55 | 165 | 220 | 561 | 781 |
| 38 | 1800 | 90 | 270 | 360 | 918 | 1278 |
| 39 | 1900 | 95 | 285 | 380 | 969 | 1349 |
| 40 | 2000 | 100 | 300 | 400 | 1020 | 1420 |
| 41 | 2100 | 105 | 315 | 420 | 1071 | 1491 |

Annotations:
- Rows 21–24: ONE (1) COMPLETE CLINIMIX 1L BAG
- Rows 28–31: ONE (1) COMPLETE CLINIMIX 1L BAG + PARTIAL 2ND BAG OR TWO (2) PARTIAL CLINIMIX 1L BAGS OR ONE (1) PARTIAL CLINIMIX 2L BAG
- Rows 38–41: TWO (2) COMPLETE CLINIMIX 1L BAGS OR ONE (1) COMPLETE CLINIMIX 2L BAG
- Further: TWO (2) COMPLETE CLINIMIX 1L BAGS + PARTIAL 3RD BAG OR THREE (3) PARTIAL CLINIMIX 1L BAGS OR ONE (1) COMPLETE OR PARTIAL CLINIMIX 2L BAG AND CLINIMIX 1L BAG Table (bottom section):

| ID | VOLUME (ml) | AA (g) | DEX (g) | AA (Kcal) | DEX (Kcal) | TOTAL (KCAL) | Na+ mEq | K+ mEq | Mg++ mEq | Ca++ mEq | Ac- mEq | Cl- mEq | PO4²⁻ mmol |
|---|---|---|---|---|---|---|---|---|---|---|---|---|---|
| 44 | 1900 | 95 | 285 | 380 | 969 | 1349 | 66.5 | 57 | 9.5 | 8.55 | 96.9 | 74.1 | 28.5 |
| 45 | 2000 | 100 | 300 | 400 | 1020 | 1420 | 70 | 60 | 10 | 9 | 102 | 78 | 30 |

Annotations:
- Row 44: ONE (1) COMPLETE CLINIMIX-E 1L BAG + PARTIAL 2ND BAG OR TWO (2) PARTIAL CLINIMIX-E 1L BAGS OR ONE PARTIAL CLINIMIX-E 2L BAG
- Row 45: TWO (2) COMPLETE CLINIMIX-E 1L BAGS OR ONE (1) COMPLETE CLINIMIX-E 2L BAG

|  |
|---|
| LIPID |
| 20% |
| KCl$_2$ |
| 2 meq/ml |
| NaCl$_4$ |
| 4 meq/ml |
| NaAc$_2$ |
| 2 meq/ml |
| CaGluc |
| 0.465 meq/ml |
| KPO$_4$ |
| 4.4 meq/ml |
| KAc |
| 2 meq/ml |

Edit Template EXTEMPORANEOUS pt >= 11 yrs — 420
422 — EXTEMPORANEOUS pt >= 11 yrs
424

Order | Infusion | Energy | Ions | CaPO4 | Labels | Patient Types | Dosing Rules Template Name: EXTEMPORANEOUS pt >=11 yrs        Therapy Type: Nutrition

| Locke... | Enter? | Substance | Value | Numer | Denom |
|---|---|---|---|---|---|
| ☑ | ☐ | Overfill | 0 | mL | /-- |
| ☐ | ☐ | Volume | 0 | mL | /-- |
| ☑ | ☑ | rate | 0 | mL | /hour |
| ☐ | ☑ | Duration | 024 | hour | /-- |
| ☐ | ☑ | Period | 24 | hour | /-- |
| ☐ | ☐ | non-TPN Volume | 0 | mL | /-- |
| ☑ | ☑ | Carbohydrates | 0 | KCal | /-- |
| ☑ | ☑ | Lipid | 0 | KCal | /-- |
| ☑ | ☑ | Protein | 0 | KCal | /-- |
| ☐ | ☑ | Clinimix E 4.25/5 | 0 | mL | /-- |
| ☑ | ☑ | Sodium | 35 | mEq | /L |
| ☑ | ☑ | Potassium | 30 | mEq | /L |
| ☑ | ☑ | Calcium | 4.5 | mEq | /L |
| ☑ | ☑ | Magnesium | 5 | mEq | /L |
| ☑ | ☑ | Phosphate | 15 | mMol | /L |
| ☐ | ☑ | Chloride | 0 | mEq | /L |
| ☑ | ☑ | Acetate | 0 | mEq | /L |
| ☑ | ☑ | M.V.I.-12 | 10 | mL | /day |
| ☐ | ☑ | Trace Elements 4 Pl | 2 | mL | /L |
| ☐ | ☐ | Heparin 1000 units/ | 0 | units | /-- |
| ☑ | ☑ | Ranitidine inj | 0 | mg | /day |
| ☑ | ☑ | Phytonadione 2mg/l | 0 | mg | /day |
| ☑ | ☑ | Levocarnitine | 0 | mg | /day |
| ☑ | ☐ | Selenium | 0 | mcg | /day |

Add Dosing Recommendations

Add Ingredient — 426
Delete Ingredient

✗ Cancel          ✓ Done — 428

FIG. 7D

△ Order Outputs: 20/926 - PATIENTID_3457, Nathan — □ ×

| Ion Summary | Nutritional summary | Order Comparison Summary | ☐ Ca/PO4 Graph | Formula | ☐ Limit Violations |

| Ingredient | Volume-mL | Sodium-mEq | Potassium-mEq | Calcium-mEq | Magnesium-mEq | Phosphate-mMol | Acetate-mEq | Chloride-mEq |
|---|---|---|---|---|---|---|---|---|
| Clinimix E 4.25/5 | 900.00 | 31.50 | 27.00 | 4.05 | 4.50 | 13.50 | 63.00 | 35.10 |
| Requested volume | 911.80 | | | | | | | |
| Overfill | 100.00 | | | | | | | |
| Total in bag | 911.80 | 31.50 | 27.00 | 4.05 | 4.50 | 13.50 | 63.00 | 35.10 |
| Total per dl | | 3.45 | 2.96 | 0.44 | 0.49 | 1.48 | 6.91 | 3.85 |
| Total per liter | | 34.55 | 29.61 | 4.44 | 4.94 | 14.81 | 69.09 | 38.50 |
| Total per day | | 31.50 | 27.00 | 4.05 | 4.50 | 13.50 | 63.00 | 35.10 |
| Total per kg | | 0.48 | 0.41 | 0.06 | 0.07 | 0.21 | 0.96 | 0.54 |

[ Close ]                                                          [ Override.. ]  [ Print ]

FIG. 7E

| Ion Summary | Nutritional summary | Order Comparison Summary | ☐ Ca/PO4 Graph | Formula | ☐ Limit Violations |
|---|---|---|---|---|---|
| Ingredient | Volume-mL | Calories-KCal | Protein-gram | Carbohydrates-gram | Non-protein Calories-KCal | Nitrogen-gram | Prot-KCal |
| Clinimix E 4.25/5 | 900.00 | 306.00 | 38.25 | 45.00 | 153.00 | 6.32 | 153.00 |
| Requested volume | 911.80 | | | | | | |
| Overfill | 100.00 | | | | | | |
| Total in bag | 911.80 | 306.00 | 38.25 | 45.00 | 153.00 | 6.32 | 153.00 |
| Total per dl | | 33.56 | 4.19 | 4.94 | 16.78 | 0.69 | 16.78 |
| Total per liter | | 335.60 | 41.95 | 49.35 | 167.80 | 6.93 | 167.80 |
| Total per day | | 306.00 | 38.25 | 45.00 | 153.00 | 6.32 | 153.00 |
| Total per kg | | 4.67 | 0.58 | 0.69 | 2.34 | 0.10 | 2.34 |
| NpCal/g-N | 24.22KCal/g | | | | | | |
| Dextrose rate | 0.48 mg/k... | | | | | | |

Order Outputs: 200926 - PATIENTID_3457, Nathan — 440

Ion Summary | Nutritional summary | Order Comparison Summary | ☐ Ca/PO4 Graph | Formula | ☐ Limit Violations — 446

| Ingredient | Volume (ml) |
|---|---|
| Clinimix E 4.25/5 | 1000.00 |
| M.V.I.-12 | 11.11 |
| Trace Elements 4 Pediatri | 2.00 |
| Total Volume | 1013.11 |

Close    Override...    Print

FIG. 7H

| Ingredient | Volume (ml) |
|---|---|
| Calcium Gluc0.232mmoL/mL | 23.66 |
| Clinimix E 4.25/10 | 2000.00 |
| Folic Acid 5mg/mL | 0.37 |
| K Phosphate 3mMol/mL PO4 | 4.55 |
| Micro+6 Regular | 3.70 |
| MVI-12 Adult | 18.52 |
| Na Acetate 4mmoL/mL | 18.22 |
| Na Chloride 4mmoL/mL | 9.16 |
| Na Phosphate 3mMol/mL PO4 | 0.12 |
| Total Volume | 2078.29 |

FIG. 7I

SYSTEMS AND METHODS FOR COMPOUNDING A PREPARATION USING A PREMIX SOLUTION

RELATED APPLICATIONS

This application claims the benefit of U.S. Provisional Patent Application No. 61/793,652 filed Mar. 15, 2013, entitled "SYSTEMS AND METHODS FOR COMPOUNDING A PREPARATION USING A PREMIX SOLUTION," which application is incorporated herein by reference in its entirety.

TECHNICAL FIELD

The disclosed embodiments relate generally to automatic compounding of a preparation associated with a requested therapy for administration to a patient that includes use of a receiving receptacle having a volume of a first component. In this regard, systems and methods disclosed herein may be related to compounding a preparation utilizing a receiving receptacle corresponding to a premix solution such that the compounder may automatically deliver amounts of an additive to the premix solution for compounding a preparation to be administered to a patient (e.g., according to a manifest received at the compounder).

BACKGROUND

A care facility may receive requests for a preparation for a therapy that is to be administered to a patient. As such, the patient care facility may prepare preparations corresponding to the requested therapy for administration to a patient. In conjunction with the compounding, the patient care facility may determine an amount for one or more ingredients for the preparation (e.g., as a precursor to compounding an order or prescription) which typically has been determined by a physician singularly or in conjunction with a dietician, pharmacist or other care provider. A pharmacy of the patient care facility may also be tasked with compounding the preparations corresponding to the requested therapy for administration to the patient.

Accordingly, the pharmacy may be required to compound large numbers of, for example, IV nutritional formulations also referred to as parenteral nutrition or PN, on a daily basis, which may be challenging. For example, due to injury, disease, or trauma, a patient may need to receive all or some of their nutritional requirements intravenously. In this situation, the patient may receive a parenteral nutritional formulation which, for example, may contain one or more of the following types of chemical ingredients: amino acids, dextrose or carbohydrate, lipid emulsions, vitamins, minerals, electrolytes, etc. Accordingly, there may be a large number of different ingredients or compounds in a typical large-volume parenteral, such as a Total Parenteral Nutrition (TPN) parenteral formulation in which perhaps 30 or more individual ingredients or components may be used.

In this regard, ready to use, pre-packaged, premix formulations (e.g., sometimes in single, double, triple, etc., chamber containers) have been proposed to provide a convenient alternative to compounding all of the potentially many ingredients or compounds in a given preparation. For example, a well-known two chamber bag product containing a solution comprising dextrose or carbohydrate in one chamber and amino acids in a separate second chamber is sold under the trademark CLINIMIX® and CLINIMIX® E (Baxter Healthcare Corporation, Deerfield, Ill.). CLINIMIX products have advanced the field of large-volume parenteral treatment by providing a wide range of physically stable, "ready-to-use", IV nutrition admixtures manufactured under sterile, high quality conditions. CLINIMIX solutions are indicated as a caloric component in a parenteral nutrition regimen and as the protein (nitrogen) source for offsetting nitrogen loss or for treatment of negative nitrogen balance in patients where: (1) the alimentary tract cannot or should not be used, (2) gastrointestinal absorption of nutrients is impaired, or (3) metabolic requirements for protein are substantially increased, as with extensive burns. FIGS. 1A and 1B respectfully illustrate the composition of various CLINIMIX and CLINIMIX E solutions.

Another well known commercially available ready to use parenteral formulation is OLIMEL™ (Amino Acids, Dextrose and Lipids, with/without Electrolytes) emulsion for infusion, sold by Baxter Healthcare Corporation. OLIMEL is marketed in a triple-chamber bag for parenteral nutrition (PN) and provides adult patients with the essential ingredients of balanced nutrition: protein, carbohydrates and lipids (fats), in a single container, simplifying the preparation of PN for hospitalized patients. The range of OLIMEL formulations, with various concentrations of protein and carbohydrates and an olive oil and soy based lipid emulsion, address the needs of specific patient groups, such as the critically ill, surgery patients and the chronically ill.

OLIMEL is available in multiple formulations, offering one of the highest protein concentration in a multichamber bag and formulations that provide a proportionate amount of glucose. OLIMEL is unique in that it contains a lipid in the form of an olive oil and soy based IV fat emulsion, Baxter's proprietary CLINOLEIC. The European Society of Clinical Nutrition and Metabolism (ESPEN) guidelines stress the need to adjust protein and energy formulas based on patients' requirements, as is offered in the OLIMEL formulations. For example, patients who have undergone trauma (such as surgery) experience a breakdown in muscle mass to support healing, so they need protein to help replace the lost muscle mass. Hospitalized patients also need energy supplied by carbohydrates, but supplying too much can lead to hyperglycemia (excessive sugar in the blood), and can impact clinical outcomes. The OLIMEL family of products enables clinicians to match the nutritional therapy to the patient, through a premixed bag that requires fewer steps from preparation to administration.

NUMETA™ was introduced by Baxter Healthcare Corporation at the 22nd Annual European Society of Pediatric and Neonatal Intensive Care (ESPNIC) Medical and Nursing Annual Congress in Hanover. Germany, as the first and only triple-chamber system with formulations specifically designed to meet the range of intravenous (IV) nutritional requirements of neonatal and pediatric patients (preterm newborns through age 18). This premix therapy addresses an important unmet medical need to support neonatal and pediatric patients' changing daily nutritional needs with ready-to-use IV nutrition.

Many preterm infants rely on IV nutrition, also known as parenteral nutrition (PN), at birth to meet all or part of their daily nutritional requirements. Unlike adults, children have a need for growth, which puts them at a particularly high risk of malnutrition because of higher nutritional demands. Acute malnutrition affects almost 25 percent of children admitted to local hospitals, with consequences that include impaired tissue function, suppressed immune systems, defective muscle function and reduced respiratory and cardiac reserve (or capacity).

This ready-to-use nutrition system provides neonatal and pediatric patients with a balanced formulation of amino acids (protein), glucose (carbohydrates), lipids (fats) and electrolytes in a triple-chamber container. NUMETA is designed according to the European Society for Pediatric Gastroenterology, Hepatology and Nutrition (ESPGHAN)-European Society for Clinical Nutrition and Metabolism (ESPEN) Guidelines for Pediatric Parenteral Nutrition to provide well-balanced nutrition that supports the growth of a majority of neonatal and pediatric patients. The ingredients are provided in separate compartments and can be mixed and administered at the point of care, reducing the possible risk of medication errors and contamination, while simplifying the prescription and delivery of parenteral nutrition. Parenteral nutrition formulations can be complex, involving numerous calculations, multiple ingredients, additive dosages and administration rates. In this regard, bags of premix formulations may be a practical option for hospitals to provide standard premix PN for patients in a convenient and easy-to-activate system. The nutritional components are stored in different sections or chambers of a bag, separated by special seals. A clinician breaks the seal between the chambers and gently mixes the admixture or solutions. With multichamber bag technology, fewer steps from preparation to administration may reduce the opportunities for error and the potential for touch contamination of the contents. In this regard, the A.S.P.E.N. guidelines support the use of standard formulations to help facilitate a standard process that reduces variation and promotes uniformity among clinicians and healthcare facilities.

Notwithstanding the benefits of premix PN formulations, and despite the fact that they are available in multiple formulations, clinicians may still desire the ability to customize individual patient prescriptions. For example, maintenance vitamins, additional electrolytes and trace elements may not be included, or they may not be present in the desired amounts. Therefore, there is a need to be able to compound ingredients, additives, and/or compounds into premix PN formulations. Methods for reliably determining amounts of an additive or ingredient additions to preparations that utilize premix parenteral solutions are therefore needed. Furthermore, after addition there may be a need to ensure that the labeling of such solutions is accurate and efficacious for that customized patient dosage form. Presently, such additions may be determined using hand calculations, and other methods that are prone to error, particularly in the treatment setting, such as at a hospital, where such calculations may be made by fatigued staff. For instance, simple computational error in such compounding with premix parenteral solutions with additions can lead to preparations with mistakes that in turn may lead to incorrectly prepared and/or mislabeled parenteral solutions and the possibility of risk to the patient. Furthermore, manual compounding of preparations by human users that include premix solutions may introduce the potential for additional errors and/or contamination of the preparation.

SUMMARY

In view of the foregoing, described herein are embodiments of systems and methods for automatically compounding, with a compounder, a preparation that includes a receiving receptacle having a volume of a first component therein (e.g., a premix solution). In this regard, an automatic compounder may be provided that includes preprogrammed logic for controlling delivery of additives to the receiving receptacle based on a manifest received at the compounder. In this regard, the manifest may include an indication of a receiving receptacle having a volume of a first component disposed therein (e.g., a premix solution or other prepackaged container containing a preconfigured amount of a component). The manifest may also include an indication of an amount of an additive to be added to the receiving receptacle to prepare the requested therapy. As such, the preprogrammed logic of the compounder may be operable to automatically selectively control the delivery of the at least one additive to the receiving receptacle based on the manifest (e.g., upon establishing fluid interconnection between the receiving receptacle and the compounder and between the additive receptacle and the compounder).

Accordingly, use of a compounder as described herein may lease reduce the human interaction needed to compound a preparation for a requested therapy. In this regard, as the amount of human intervention may be reduced by at least partially automating the compounding, the likelihood of errors and/or contamination of the preparation may be reduced. That is, for example, as a plurality of additives may be added to the receiving receptacle with a single, one time fluid interconnection between the receiving receptacle and the compounder, the potential for contamination of the preparation in the receiving receptacle may be reduced simply by reduction in the number of fluid interconnections and disconnections required of the receiving receptacle. Furthermore, the automation of the addition of additives to the receiving receptacle may reduce the risk of a human user in virtually adding an incorrect additive, an incorrect amount of an additive, or an additive in an incorrect sequence to a preparation.

In this regard, it may be appreciated that use of compounder in an at least partially automated fashion as described herein may provide significant benefit over manual processing or the like. Namely, as the automated compounders and method related thereto described herein may facilitate a single, one time fluid interconnection, fewer fluid interconnections and disconnections may be made using a compounder as described herein than with, for example, manual compounding. As each fluid interconnection and disconnection results in an opportunity for microbial contamination, errors in the nature of an additive (e.g., use of an incorrect additive, use of an incorrect concentration of an additive, etc.), and errors in sequence of additives, reduction of the number of fluid interconnections and disconnections is advantageous. This may especially be the case in the use of TPN, which may involve introduction of a preparation directly to the central vasculature of a patient. Thus, traditional mechanical, biological, or other safeguards may not be present, thus heightening the need for reduction in microbial contamination, the potential for errors in the nature of an additive, and errors in the sequencing of additives.

Furthermore, use of a compounder described herein may facilitate uniform protocols that may be applied throughout a facility in which the compounder is used. As such, human circumvention of protocols or human errors may be reduced. In turn, a consistent protocol for preparation may be utilized. In turn, it may be further recognized that changes in such a protocol may be effectively communicated to one or more compounders for compliance with changed protocols (e.g., without having to retrain personnel and rely on compliance with new protocols that may be unfamiliar to personnel). Thus, use of a compounder as described herein may provide these or other benefits that may improve patient safety, improve pharmacy efficiency (e.g., reducing the number of preparations needed to be prepared multiple times or be reworked), and provide increase uniformity throughout a pharmacy.

Additionally, the compounder (e.g., a preprogrammed logic of the compounder) may be operable to confirm one or more properties of the receiving receptacle to help reduce errors associated with using an incorrect receiving receptacle and/or errors in delivery of an additive. For instance, the compounder may be operable to measure one or more physical properties of a receiving receptacle located relative to a receptacle support of the compounder. In this regard, the compounder may be operable to measure a weight, volume, size, and/or other physical property of a receiving receptacle located relative to a receptacle support of the compounder. Such a physical property may be measured prior to and/or after delivery of one or more additive to the receiving receptacle. As such, the measured physical property may be compared to an expected physical property. The expected physical property may be a beginning physical property of the receiving receptacle that may be used to confirm use of a correct receiving receptacle, and/or the expected physical property may be an ending physical property that may be used to confirm correct delivery of additives to the receiving receptacle. As such, the expected ending physical property may be determined based on the beginning physical property and the amount(s) of additive(s) to be added to the receiving receptacle.

Additionally, the compounder may be operable to obtain information that is indicative of the identity of the receiving receptacle received at a compounder. For example, the receiving receptacle may be provided with an indicia regarding the identity of the receiving receptacle (e.g., including information indicative of one or more components provided therein, the volume of the components, a predetermined total available volume of the receptacle, etc.). The indicia may be a machine readable indicia and the compounder may be provided with a corresponding reader for reading the machine readable indicia. For example, the indicia may be a bar-code, a radio frequency identification (RFID) tag, or other appropriate machine readable indicia, and the reader may be a bar-code reader, and RFID reader, or other appropriate reader (e.g., a vision system using optical character recognition or the like).

Furthermore, the compounder may perform a verification of a manifest once the manifest has been received to determine whether the requested preparation is appropriate for the receiving receptacle indicated for inclusion in the preparation. For example, the receiving receptacle may include a predetermined total available volume. The predetermined total available volume may include a maximum volume of additives that may be introduced into the receiving receptacle (e.g., bag). It should be noted that the predetermined total available volume may, but need not, correspond to the total volumetric capacity of the receiving receptacle. For example, the predetermined total available volume may be a manufacturer designated value for a given receptacle. In any regard, a headspace measure may be provided or determined based on the predetermined total available volume and the volume of the component(s) in the receiving receptacle. For example, the headspace measure may comprise a headspace volume measure corresponding to the difference of the predetermined total available volume and the volume of the component(s) of the receiving receptacle. In this regard, once the manifest is received, the compounder (e.g., a preprogrammed logic of the compounder) may compare the sum of the amounts of additives to be delivered to the headspace volume measure. Based on this comparison, the compounder may be operable to determine if the headspace volume capacity would be exceeded by the preparation indicated by the manifest. If the headspace volume measure for the receiving receptacle is insufficient to accommodate the additives, the compounder may produce and/or output an alert regarding the discrepancy between the sum of the additive amounts and the headspace volume measure.

As described above, the receiving receptacle may comprise a multichambered receptacle having components are stored in different sections or chambers of a bag, separated by special seals. As may be appreciated, the seals may be activated prior to receiving one or more additives into the receiving receptacle. Accordingly, the compounder may include an appropriate receptacle activation sensor to determine if the seal of a multichambered bag has been defeated. The receptacle activation sensor may include any appropriate physical, optical, electrical, or other type of sensor capable of detecting whether a seal has been defeated. For example, the receptacle activation sensor may be a physical sensor that may be in contact with a receiving receptacle located at a receptacle support of the compounder. In an embodiment, the receptacle activation sensor may include or employ a machine vision system capable of viewing and detecting a status of the receiving receptacle.

Accordingly, it may also be appreciated that the compounder may be operable to store, and/or access at a remote memory, one or more portions of information regarding a plurality of receiving receptacles. For instance, the compounder may include a memory or be networked to communicate with a memory that may include a database concerning different potential receiving receptacles for use with the compounder. In this regard, the database may include, for example, information for each receiving receptacle that includes:

an identity of at least a first component contained by the receiving receptacle;
a volume of the at least a first component contained by the receiving receptacle;
a predetermined total available volume of the receiving receptacle;
a headspace volume measure of the receiving receptacle;
an expected beginning physical property of the receiving receptacle; and
a product ID.

As such, the information stored in the database may be compared to measured properties and/or information received relating to the receiving receptacle (e.g., machine readable data that is read by the compounder). Accordingly, the measure data and/or information received relating to the receiving receptacle may correspond to at least one portion of the information stored in the database. It may be appreciated that verification and/or checking of measured properties and/or information received relating to the receptacle relative to the information in the database may be important to reduce risk of errors in compounding of a preparation (e.g., to ensure product safety, product integrity, etc.). In this regard, if any of the measured properties and/or received information relating to the receiving receptacle is unacceptable, the delivery of additives to the receiving receptacle may be disabled.

As indicated above, a compounder may be operable to receive a manifest that includes an indication of a receiving receptacle and an indication of an amount of at least one additive to be added to the receiving receptacle. In an embodiment, the manifest may be received at the compounder by way of a user input. Accordingly, the compounder may include a user interface with which a user may manually input a manifest for a preparation to be compounded. Additionally or alternatively, the compounder may receive a manifest as machine readable data. For example, the compounder may receive the manifest locally by way of a removable storage device or may be networked to receive the machine readable data comprising the manifest via a network connection.

In the latter regard, the manifest may comprise a manifest output that is generated automatically. Accordingly, also described herein are embodiments of systems and methods for determining an amount of an ingredient or additive, or amounts of a plurality of ingredients or additives, for a preparation for a requested therapy to be administered to a patient. For example, the requested therapy may include use of a premix solution to which at least a first addition from a plurality of additions may be added. In this regard, in determining the amount (e.g., volume) of the first addition for the preparation for the requested therapy, the embodiments of systems and methods described herein may be operative to determine, in an at least partially computer automated fashion, an additive volume of the first addition to be added to the premix solution to yield the desired preparation for therapy administration to the patient.

In some instances, a premix solution may be provided in one or more predetermined volumes (e.g., such as prepackaged bags containing a certain volume of premix solution). Thus, if an ordered amount of the therapy to be administered differs from the volume of premix solutions available, a determination (e.g., an automated calculation) may be performed to determine the appropriate amount of addition(s) to be added to an available premix solution to satisfy the requested therapy using the premix solution. For such purpose, various approaches are described herein to determine an amount of an ingredient for a preparation of a requested therapy utilizing a premix solution (e.g., including one or more prepackaged bags of premix solution).

In this regard, specific references may be made herein to systems and/or methods for filling a parenteral or enteral prescription. However, it may be appreciated that the systems and methods described in the context of filling a parenteral or enteral prescription may be generally applicable to any requested therapy. For example, systems and methods described herein may be used in determining an amount for one or more ingredients of a preparation for any therapy to be administered that includes a predetermined volume to which ingredients or additions are to be added and/or the automatic compounding thereof.

The present disclosure addresses at least some of the limitations and disadvantages described above by providing, for example, a compounder having preprogrammed logic for automatically controlling delivery of one or more additives to a receiving receptacle having a volume of a component contained therein. In this way, any number of amounts for additions may be safely and reliably added to a premix parenteral solution, either nutritional (such as CLINIMIX or CLINIMIX E), or purely pharmaceutical, or a combination thereof, while minimizing the introduction of human error that may arise through manual or other ad hoc methods of adding an additive to a premix solution.

The following presents a summary in order to provide a basic understanding of some of the aspects of the present disclosure. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

As briefly described above, a requested therapy may be provided in the context of an order or prescription (e.g., for a parenteral or enteral prescription or order). Additionally or alternatively, the therapy may generally correspond to any fluid to be administered to a patient including, for example, any intravenous fluid. In this regard, the intravenous fluid may include nutritional components used in the context of parenteral or enteral feeding, or the intravenous fluid may be provided in a context other than parenteral or enteral feeding such as, for example, any context in which an intravenous fluid is to be prepared for administration to a patient. In this regard, the preparation need not be associated with a prescription, but rather may be associated with any requested therapy (e.g., such as an ordered therapy in a patient care facility).

Method embodiments described herein may include a method for use of an automatic compounder for compounding a preparation corresponding to a requested therapy to be administered to a patient that may include receiving, at the compounder, a manifest corresponding to the preparation to be compounded. The manifest may include an indication of a receiving receptacle that contains a volume of at least a first component for inclusion in the preparation and an indication of an amount of at least one additive to be added to the receiving receptacle. The method may also include establishing fluid interconnection between a delivery port of the compounder and the receiving receptacle and between an input port of the compounder and an additive receptacle containing the additive to be added to the receiving receptacle.

As the receiving receptacle may comprise a prepackaged container containing an amount of at least the first component, the establishing may be a first fluid interconnection between the delivery port of the compounder and the receiving receptacle. That is, as the receiving receptacle may comprise a prepackaged container (e.g., a premix solution), the volume of the at least first component may already be disposed in the bag at the time of initially establishing a fluid interconnection at the compounder between the delivery port and the receiving receptacle. Accordingly, the prepackaged container may be manufactured at a first location remote from the compounder. The prepackaged container may be sealed (e.g., within a sealable packaging or by sealing the prepackaged container itself) and transported in a sealed condition to a second location. The second location may be a facility at which the compounder is disposed. As such, the method may further include accessing the sealed prepackaged container containing the volume of the at least first component (e.g., by removing the prepackaged container from sealed packaging or by accessing a sealed portion of the container itself) during the establishing step.

In turn, the method may include delivering, using a preprogrammed logic of the compounder, the amount of the additive from the additive receptacle to the receiving receptacle at least partially based on the manifest. In this regard, the preprogrammed logic of the compounder may automatically control flow from the input port to the delivery port.

A number of feature refinements and additional features are applicable to the foregoing method. These feature refinements and additional features may be used individually or in any combination. As such, each of the following features that will be discussed may be, but are not required to be, used with any other feature or combination of features of the foregoing method.

In an embodiment, the manifest may include an indication of an amount for each of a plurality of additives to be added to the receiving receptacle. Accordingly, the establishing may include establishing fluid interconnection between a plurality of additive receptacles corresponding to the plurality of additives and a plurality of respective input ports of the compounder. As such, the delivering may include selectively controlling flow from each of the plurality of input ports and the delivery port to deliver the amount of each of the plurality of additives at least partially based on the manifest.

In an embodiment, the method may include receiving the receiving receptacle at a receptacle support of the compounder. In turn, the method may include measuring, at the compounder in response to receiving the receiving receptacle, at least one beginning physical property of the receiving receptacle prior to the delivering. Also, the method may include comparing, using the preprogrammed logic, the least one beginning physical property of the receiving receptacle measured by the compounder to an expected physical property for the receiving receptacle.

Also, in an embodiment, the method may include retrieving, with the preprogrammed logic from a memory at the compounder, a headspace measure for the receiving receptacle. The headspace measure may be at least partially based on the volume of the first component in the receiving receptacle and a total predetermined available volume of the receiving receptacle. For example, the headspace measure may be the volume difference between the total predetermined available volume of the receiving receptacle and the volume of the first component in the receiving receptacle. In this regard, the method may include maintaining, in the memory at the compounder, a description of a plurality of receiving receptacles that may include information related to at least one of a headspace volume measure, a predetermined total available volume, a first component, and a beginning physical property for each of the plurality of receiving receptacles. As such, the indication of the receiving receptacle of the manifest may correspond to one of the plurality of receiving receptacles for which a description is maintained in the memory at the compounder.

Accordingly, in an embodiment, the method may include comparing, using the preprogrammed logic, the headspace volume measure to the sum of the amounts of the plurality of additives. As such, the method may also include generating an alert at the compounder when sum of the amounts of the plurality of amounts of additives exceeds the headspace volume measure.

Furthermore, after the delivering, the method may include analyzing at least one ending physical property of the receiving receptacle that is determined at the compounder to an expected ending physical property. For instance, the expected ending physical property may be at least partially based on the beginning physical property and the plurality of amounts of additives. For instance, the expected ending physical property may be the beginning physical property (e.g., an initial weight of the receiving receptacle) plus any addition to the physical property contributed by the additive (e.g., the weight of each additive).

In an embodiment, the method may include obtaining, at the compounder, information indicative of the identity of the received receiving receptacle prior to the establishing. The obtaining may include reading, with the compounder, a machine readable indicia corresponding to the receiving receptacle. For instance, the machine readable indicia may be one of an RFID tag or a bar code physically provided with the receiving receptacle. Accordingly, the machine readable indicia corresponding to the received receiving receptacle may be compared, using the preprogrammed logic, to the indication of the receiving receptacle from the manifest to verify a received receiving receptacle corresponds to the indication of the receiving receptacle.

In an embodiment, the receiving receptacle may be a multichamber bag. In this regard, the method may also include determining, at the compounder prior to the delivering, that the multichamber bag has been activated to establish continuous fluid communication throughout each chamber of the receiving receptacle.

Additionally, the manifest may be received via a number of modalities. For instance, in an embodiment, the receiving of the manifest comprises accepting inputs from a user by way of a user interface at the compounder. In an embodiment, the receiving of the manifest may include obtaining a manifest output corresponding to the preparation as machine readable data. In this latter regard, the manifest output is automatically generated based on a first selection corresponding to a premix solution and a second selection corresponding to the additive.

In an embodiment, the receiving receptacle may be an administration receptacle from which the preparation is to be administered to the patient. In this regard, the number of times the receiving/administration receptacle is fluidly interconnected and disconnected may be reduced to further reduce the potential for contamination of the receptacle. As such, the receptacle may be maintained sterile with fewer opportunities for contamination.

In an embodiment, the method may include prompting a user to locate the receiving receptacle at the receptacle support and establish fluid interconnection between the receiving receptacle and the delivery port. The prompting may include information that is presented to a user regarding the receiving receptacle that is to be located at the receptacle support (e.g., which may be verified by receiving information regarding the receiving receptacle as described above).

In an embodiment, the compounder may store or have access to rules regarding interactions for various additives. In this regard, the method may include sequencing, using the preprogrammed logic, the delivery of the plurality of additives to reduce interaction of potentially incompatible ingredients. Thus, the potential for potentially adverse interaction of additives may be minimized.

Furthermore, it may be appreciated that given the potentially large number of additives that may be added to the receiving receptacle, the disparity between the amount of additives may be large. As such, the compounder may be operable to deliver a range of additive amounts ranging from relatively small additive amounts to relatively large additive amounts. For example, in an embodiment, the delivery comprises adding from about 0.1 ml of the additive to the receiving receptacle to about 750 ml of the additive to the receiving receptacle.

Additionally, systems are described herein that relate to the automatic delivery of an additive amount to a receiving receptacle having a volume of fluid therein. For example, a compounder that is operable to compounder preparation corresponding to a requested therapy to be administered to a patient may be provided that includes a preprogrammed logic operable to receive a manifest corresponding to the preparation to be compounded, wherein the manifest comprises an indication of a receiving receptacle. The manifest may contains a volume of at least a first component for inclusion in the preparation and an indication of an amount of at least one additive to be added to the receiving receptacle. The compounder may include a delivery port selectively fluidly interconnectable with the receiving receptacle and an input port selectively fluidly interconnectable with an additive receptacle containing the additive to be added to the receiving receptacle. The compounder may also include a flow controller fluidly interconnected between the input port and the delivery port that is operable to control the flow of the additive responsive to the preprogrammed logic from the input port to the delivery port for addition to the receiving receptacle at least partially based on the manifest.

In an embodiment, the manifest may be generated automatically in response to a requested therapy. In this context, an embodiment of the method may also include receiving a first selection of a premix solution from a plurality of premix solutions and an ordered amount of premix solutions. Each respective one of the premix solutions may include a predetermined description that at least includes an identifier for the respective premix solution, a volume of the respective premix solution a bag, and an amount of a first component in the respective premix solution. The method may further include receiving a second selection that includes a first amount of a first addition. The first addition may be from a plurality of additions, wherein the plurality of additions are predefined in a formulary comprising at least one formulary concentration for each respective addition in the plurality of additions.

The method may further include determining an additive volume for at least the first addition. In this regard, it may be appreciated that selections for, and determinations with respect to, additional additions corresponding to, for example, second additions, third additions, etc., may be provided for in the method, as discussed in greater detail below. In any regard, the determined additive volume that is to be added to the premix solution may be determined at least partially based on the order amount, the volume of the premix solution, the first amount of the first addition, and the formulary concentration for the first addition. For instance, the determination may include considerations relating to differences in volumes between the ordered amount and the premix solution volumes such that the additive volume may reflect and compensate for such differences.

In some embodiments the ordered amount (i.e., the amount corresponding to volume of the requested therapy to be administered to the patient) may be less than the volume of the premix solution corresponding to the first selection. In such embodiments, the method may further include calculating a partial infusion factor based on the order amount and the volume of the premix solution. In turn, the additive volume may at least partially be based on the partial infusion factor. For example, the partial infusion factor may include the quotient of the volume of the premix solution and the ordered amount. In other embodiments, the order amount may be larger than any one of the volumes of the plurality of premix solutions that are available. As such, the requested therapy may be prepared using a plurality of bags of premix solution. In this regard, the method may further include calculating at least one aliquot volume for the additive volume corresponding to the respective portion of the additive amount for addition to each of the plurality of bags of the premix solution. In an embodiment, the calculating may include aliquoting the additive volume equally between the plurality of bags of premix solution.

In another embodiment, the second selection may include a second amount of a second addition from the plurality of additions. In this regard, the determining may include determining an additive volume for the second addition that is to be added to the premix solution. The additive volume for the second addition may at least partially based on the additive volume for the first addition, the ordered amount, the volume of the premix solution, the second amount, and the formulary concentration for the second amount. In this regard, as described to above, a plurality of additions may be selected for a given requested therapy. As such, the additive volume for the first addition and the additive volume for the second addition may affect the total volume. That is, upon the addition of either the first and/or second addition to the premix solution, the total volume of the resulting combination will be larger than the volume of the premix solution prior to the additions. In this regard, the determining step may include iteratively solving for the additive volume of the first and/or second addition based on the affect of the additive volume for the first addition and the additive volume for the second addition on the ordered amount.

By way of example, in a first iteration, the additive volume for the first addition may be at least partially based on the total volume of the first addition and the volume of the premix solution. Using this total volume, the additive volume for the second addition may be calculated. It may be appreciated that, since the second addition adds additional volume to the previously determined total volume, the calculated additive volume for the first addition may become diluted. That is, the total volume used in the calculation of the additive volume for the first addition in the first iteration may be less than the amount needed to achieve the amount of the first addition of the ordered therapy based on the additional additive volume associated with the second addition. In this regard, the additive volume for the first addition may be recalculated based on the total volume of the ordered amount that includes the portion contributed by the second addition. In turn, the newly determined additive volume for the first addition may be used in recalculating the additive volume for the second addition. This iterative calculation of the additive volumes for the first and second additions may continue until a steady state is reached, until the change in additive volume between iterations is below a predetermined threshold, or until some other appropriate condition is achieved. Furthermore, it may be appreciated that such iterative calculations may extend to the addition of more than two additions.

In an embodiment, the method may include outputting a manifest output corresponding to the preparation. Accordingly, the manifest output may be received by the compounder (e.g., via a network connection). The manifest output may comprise machine readable data that may be interpreted by the preprogrammed logic of the compounder to facilitate automatic delivery of the additives to a premix solution as recited in the manifest output. For example, the manifest output may include at least one of contents of a corresponding bag, including a final amount of the first compound and a final amount of the first addition in the corresponding bag, instructions for adding at least one aliquot volume for the additive volume among a plurality of bags of the premix solution, or instructions for withdrawing a draw down amount from at least one bag of premix solution. Additionally, the method may include preparing an overlabel for a bag of premix solution comprising the manifest output. As such, in the case where the manifest is manually entered by a user, the user may be operable to read the manifest from the overlabel for entry of information or instructions comprising the manifest.

BRIEF DESCRIPTION OF THE DRAWINGS

FIGS. 1A and 1B respectively provide the contents of various CLINIMIX and CLINIMIX E solutions in accordance with the prior art.

FIG. 4A illustrates a data structure that details the elements of an exemplary prescription according to certain embodiments.

FIG. 4B illustrates a data structure that details the contents of an exemplary manifest according to certain embodiments in which each bag used to fill a prescription is either not drawn down or is drawn down by the same amount.

FIG. 4C illustrates a data structure that details the contents of an exemplary manifest according to certain embodiments in which each bag used to fill a prescription is drawn down by an independent amount.

FIG. 5 illustrates an exemplary premix solution list in accordance with an embodiment of the present disclosure.

FIG. 6 illustrates an exemplary formulary in accordance with an embodiment of the present disclosure.

FIG. 7A illustrates an interactive user interface screen employable to display and edit a formulary ingredient listing in an embodiment of a prescription order entry system of the present disclosure.

FIG. 7C illustrates an interactive user interface screen employable to complete or edit a prescription order template for an order comprising a premix solution in an embodiment of a prescription order entry system of the present disclosure.

FIG. 7D illustrates an interactive user interface screen employable to complete and enter a prescription order utilizing a prescription order template in an embodiment of a prescription.

FIG. 7E illustrates an interactive user screen employable to display order content summaries, including an ion content summary.

FIG. 7F illustrates an interactive user screen employable to display order content summaries, including a nutritional content summary.

FIG. 7G illustrates an interactive user screen employable to display order content summaries, including an overall order formula summary.

FIG. 7H illustrates an interactive user interface screen employable to complete and enter a prescription order utilizing a prescription order template in an order entry system of the present disclosure.

FIG. 7I illustrates a formula listing corresponding with the prescription order of FIG. 7H.

Like reference numerals refer to corresponding parts throughout the several views of the drawings.

DESCRIPTION OF EMBODIMENTS

As described above, the present disclosure generally relates to systems and methods for automatically compounding a preparation corresponding to a requested therapy for administration to a patient. Accordingly, initially presented herein is a description of an embodiment of compounder 800 with reference to FIG. 8. Thereafter, a method 900 is described with reference to FIG. 9 according to embodiment of a method for use of an automatic compounder. In addition, the present disclosure includes details of embodiments for determining an amount of an additive for use in a preparation. It may be appreciated that such embodiments for determining an amount of an additive for use in a preparation may be, but are not required to be, utilized in conjunction with the embodiments for automatic compounding presented herein. As such, the disclosure regarding determining an amount data for use in the preparation is provided for illustration of one potential embodiment related to generating a manifest for use with the compounder.

Figure 8:
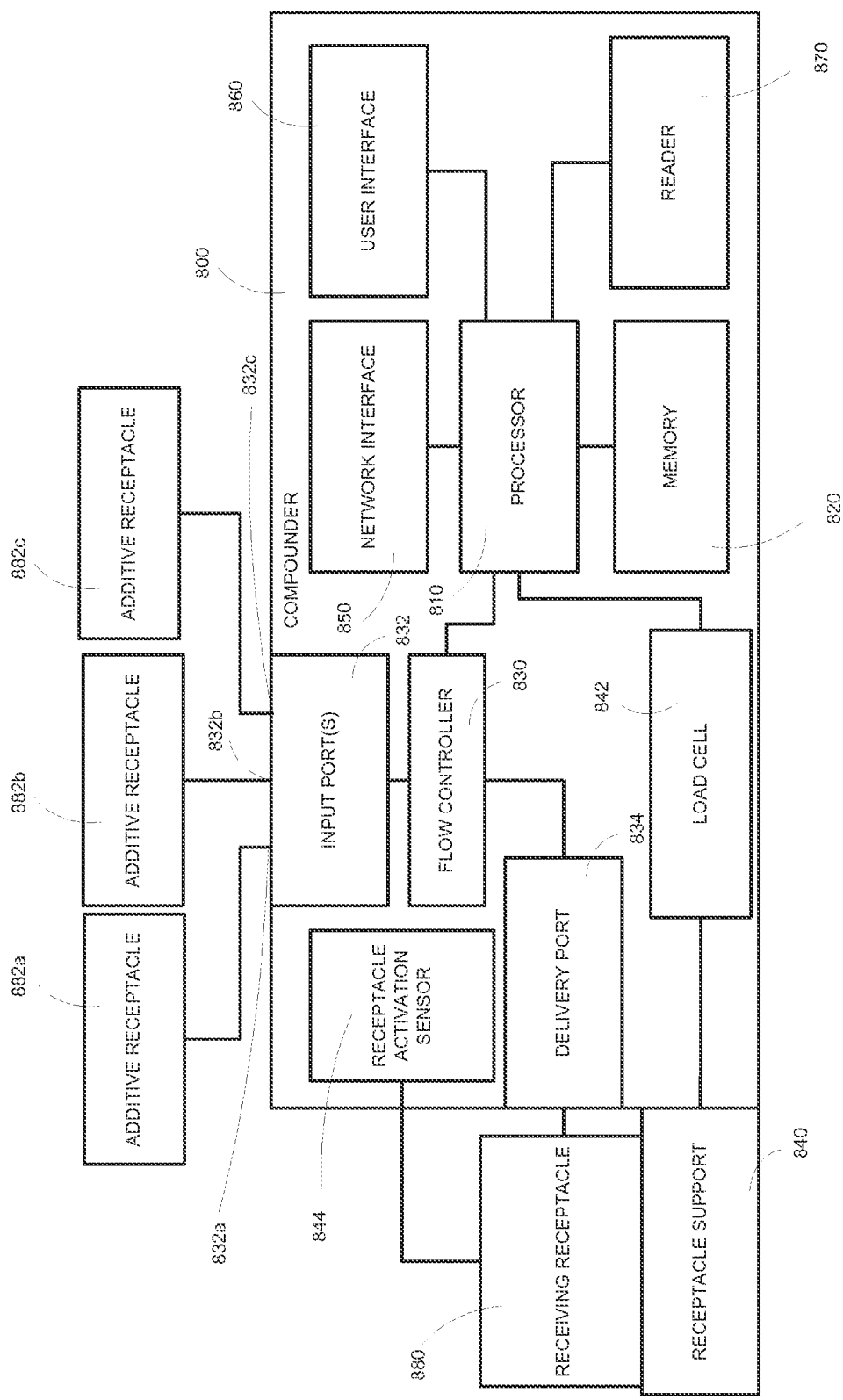
FIG. 8 is a schematic drawing illustrating an embodiment of an automatic compounder for use in compounding a preparation.

Turning now to a description of an embodiment of compounder according to the present disclosure, FIG. 8 depicts an embodiment of a compounder 800 may be utilized to automatically compound a preparation for administration to a patient. Specifically, the compounder 800 may be operative to controllably deliver one or more additives to a receiving receptacle 880. The receiving receptacle may contain a volume of a first component that is prepackaged or preconfigured in the receiving receptacle 880 prior to delivery of an additive thereto (e.g., the receiving receptacle may comprise a premix solution). As will be described in greater detail below, the compounder 800 may also include features that may be used to monitor the receiving receptacle 880 into which a preparation is compounded and/or one or more aspects of the delivery of the additive to the receiving receptacle 880.

The compounder 800 may include a preprogrammed logic operable to control the operation of the compounder 800. For example, the compounder 800 may include a microprocessor 810 in operative communication with at least one memory 820 also provided with the compounder 800. In this regard, the memory 820 may store computer executable program code that includes instructions for operation of the compounder 800 as will be described in greater detail below. Accordingly, the processor 810 may be a general use microprocessor that is specifically configured to control the compounder 800 based on the access and execution of preprogrammed computer readable program code stored in the memory 820. In this regard, the processor 810 and memory 820 may collectively define a preprogrammed logic of the compounder 800. As such, the compounder 800 may be operable to perform compounding as described herein in at least partially computer automated fashion (e.g., substantially free from human interaction to control the delivery of an additive to receiving receptacle 880).

The processor 810 may be in operative communication with a network interface 850. In this regard, the network interface 850 may include a device or module that facilitates networked communication between the compounder 800 and at least one other computing device. In this regard, the processor 810 may access remote memory resources, such as remote database or the like. Accordingly, while some data is described as being stored in the memory 820 locally at the compounder 800, it may be appreciated that in some embodiments, at least some portions of data described as being stored in the memory 820 may additionally or alternatively be accessed at a remote memory device by way of the network interface 850.

In an embodiment, the compounder 800 may be operative to receive machine-readable data via the network interface 850. For example, in an embodiment, the compounder 800 may receive a manifest output such as will be described below in greater detail that may result from a process for determining at least one additive amount for addition to a premix solution).

The processor 810 may be in operative communication with a user interface 860. In an embodiment, the user interface 860 may be operative to receive manually inputted user instructions corresponding to a manifest associated with the preparation corresponding to a requested therapy to be administered to the patient. That is, the user interface 860 may include appropriate user interface devices (e.g., such as a display, a keyboard, a mouse, a touchscreen interface, or other appropriate machine human interface) for receiving user inputs. In this regard, user inputs may correspond to a manifest associated with a preparation to be prepared by the compounder 800. The user interface 860 may also be utilized to display alerts and/or receive responses to an alert from a user as will be described in greater detail below.

It may be appreciated that the compounder 800 may include one or more fluid input ports 832. Accordingly, fluid interconnection may be established between corresponding ones of the input ports 832a-332c and additive receptacles 882a-882c. Each of the additive receptacles 832a-832c may contain a different additive such that the compounder 800 may selectively control flow of each respective additive from a corresponding one of the additive receptacles 882a-882c to a delivery port 834 of the compounder 800. In this regard, the processor 810 may also be in operative communication with a flow controller 830 the may be adapted to control the flow of an additive from one or more input ports 832 to the delivery port 834. In turn, fluid interconnection may be established between the delivery port 834 and a receiving receptacle 880. As such, the processor 810 of the compounder 800 may be operable to control the flow controller 830 for selective and controlled delivery of an additive from an additive receptacle 882 to the receiving receptacle 880.

The flow controller 830 may comprise any appropriate mechanism or combination of mechanisms known in the art to selectively control the flow of an additive from an input port 832 to the delivery port 84. For example, the flow controller 830 may include a pump, such as a peristaltic pump, or other device used to selectively control flow between input port 832 and a delivery port 834. Of note, the flow controller 830 may be a precision control device capable of delivering precise amounts of fluid (e.g., with granularity to 0.1 ml resolution, 0.01 ml resolution, or even 0.001 ml resolution). Furthermore, the flow controller 830 may be capable of delivering a range of additive amounts from a relatively small amount to a relatively large amount of additive by way of the delivery port 834 to the receiving receptacle 880. For example, the flow controller 830 may be operable to provide as little as about 0.1 ml and as much as about 750 ml of an additive to the receiving receptacle 880. Accordingly, a wide variety of amounts of additives may be delivered to the receiving receptacle 880 using the compounder 800.

The receiving receptacle 880 may be received on a receptacle support 840 of the compounder 800. In this regard, the receptacle support 840 may supportably engage the receiving receptacle 880. The receiving receptacle support 840 may include one or more measurement device(s) capable of measuring at least one physical property of the receiving receptacle 840 supportably engaged by the receptacle support 840. For example, the physical property of the receiving receptacle 880 measured by the compounder 800 may correspond to, for example, a weight, or other appropriate physical property the receiving receptacle 880. For example, the receptacle support 840 may also be in operative communication with a load cell 842 capable of weighing the receiving receptacle 880 that is supportably engaged by the receptacle support 840. For example, in an embodiment, the load cell 842 may be integrated with the receptacle support 840 for measurement of the receiving receptacle 880 supportably engaged by the receptacle support 840. In addition, other appropriate sensors for measuring a physical property of the receiving receptacle 880 may be provided. For example, sensors capable of detecting a volume, a change in weight, an optical property change, lexical property change, or any other appropriate other physical measure or change in physical measure of the receiving receptacle 880 may be provided. In this regard, a beginning physical property of the receiving receptacle 880, and ending physical property of the receiving receptacle 880, or an intermediary physical property (e.g., as measured between editions of additives to the receiving receptacle 880 may be measured.

Also, while not shown in FIG. 8, an appropriate additive receptacle sensor may be provided that is capable of detecting the physical property (e.g. weight, volume, size, etc.) of an additive receptacle at the compounder 800. In this regard, the physical property of the additive receptacle may also be monitored at the compounder 800. For example, upon disposing an additive receptacle relative 882 to the compounder 800, the compounder may receive an indication of the identity of the additive receptacle 882 which maybe use in turn to retrieve an expected property of the additive receptacle 882 to verify the additive receptacle 882.

Furthermore, the compounder 800 may include a multichamber activation sensor 844. In this regard, as described above, the receiving receptacle 880 may comprise a multichamber bag having multiple chambers separated by a defeatable seal that separates respective ones of the multiple chambers. In this regard, the premix solution bag may be activated by overcoming the seal separating the multiple chambers such that continuous fluid communication throughout each chamber of the premix solution bag is established. In this regard, the multichamber activation sensor 844 may be capable of verifying that the receiving receptacle 880 has been activated such that a seal has been defeated prior to delivery of an additive to the receiving receptacle 880 by the compounder 800. As such, the multichamber activation sensor 844 may comprise any appropriate physical, optical, electrical, or other sensor for detecting whether the seal in a receiving receptacle 880 has been defeated to activate the receiving receptacle 880. For example, the multichamber activation sensor 844 may comprise a physical limit switch contacted by the receiving receptacle 880 such that the status of the receiving receptacle 880 may be discerned by the limit switch. In an embodiment, the receptacle activation sensor 844 may comprise machine vision system capable of discerning based on a recognized physical appearance of the receiving receptacle 880 whether the receiving receptacle 880 has been activated and a seal has been defeated. In various other embodiments, additional or other sensors may be provided to verify activation of the receiving receptacle 880 prior to delivery.

Furthermore, the compounder 800 may include a reader 870 for receiving an indicia corresponding to the identity of the receiving receptacle 880. For example, the receiving receptacle 880 may be provided with an indicia that indicates information regarding the receiving receptacle 880. As such, the reader 870 may be operable to read the indicia provided on the receiving receptacle 880 to verify the identity of the receiving receptacle 880 prior to delivering an additive thereto. In this regard, the indicia may be a machine readable indicia such as a bar code, an RFID tag, or other appropriate machine readable indicia. In like regard, the reader 870 may comprise a barcode reader, an RFID tag reader, or other appropriate reader capable of interpreting the indicia provided with the receiving receptacle 880. In an embodiment, the information regarding the identity of the receiving receptacle 880 may be manually input by a user by way of the user interface 860. In this regard, a user may enter text, a code, or other identifying information related to the receiving receptacle 880. Additionally, the reader 870 may be used to receive information regarding the identity of an additive receptacle 882.

Figure 9:
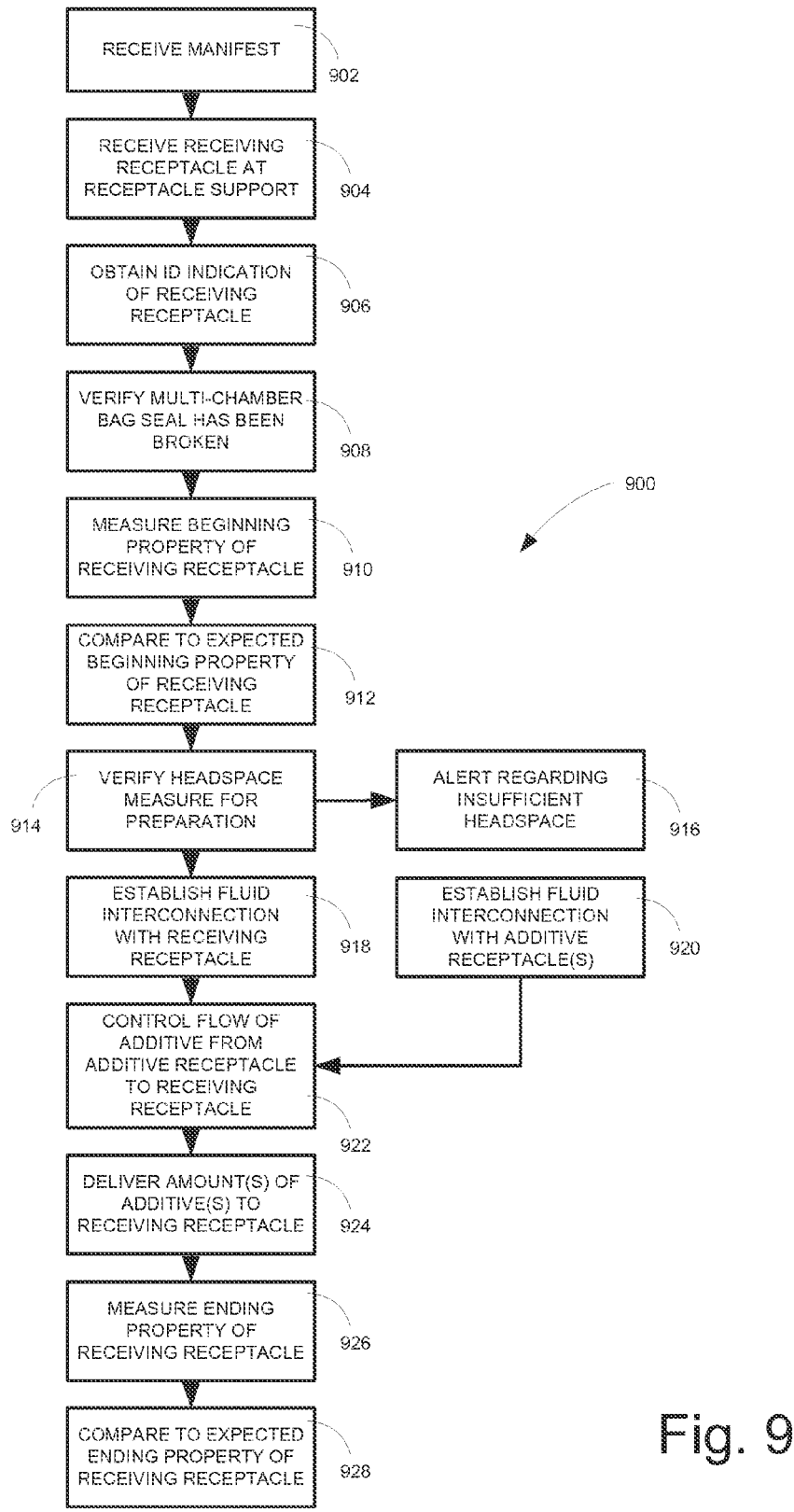
FIG. 9 is a flow diagram illustrating an embodiment of a process for compounding a preparation with a compounder.

With further reference to FIG. 9, an embodiment of a method 900 for compounding preparation utilizing an automatic compounder is illustrated. As may be appreciated, reference to FIG. 8 may be utilized in describing the method 900. In this regard, the discussion of the method 900 may highlight features or functions facilitated by the compounder 800. However, it may be appreciated that the method 900 may be utilized by any appropriate compounding hardware capable facilitating the method 900 and need not be limited to a compounder 800 as described in FIG. 8.

The method 900 may include receiving 902 a manifest at a compounder 800. The manifest may correspond to a preparation be compounded by the compounder 800. In this regard, the manifest may include an indication of a receiving receptacle 880 that contains a volume of the least a first component for inclusion in the preparation. For instance, the indication of the receiving receptacle may include an identifier of a premix solution (e.g., a PN solution) contained in a bag as will be described in greater detail below. The manifest may also include an indication of an amount of at least one additive to be added to the receiving receptacle 880 in connection with compounding of the preparation corresponding to the requested therapy. In an embodiment, the manifest may include a plurality of amounts corresponding to a plurality of additives to be added to the receiving receptacle by the compounder 800. For example, as many as 30 or more additives each with corresponding amounts may be indicated for inclusion in the preparation by the compounder 800. In turn, it may be appreciated that manually compounding such preparations may be time-consuming and/or introduce substantial risk for contamination and/or mistakes in the compounding. As such, as described above, automation of the delivery of an additive to a receiving receptacle 880 may assist in reducing costs and/or risks associated with compounding preparations.

The method 900 may include receiving 904 the receiving receptacle 880 at the receptacle support 840. For example, the compounder 800 may prompt a user to locate a receiving receptacle 880 with respect to the receptacle support 840. The prompting may include an indication of the identity of the receiving receptacle 880 to be located at the receptacle support 840. As described above, receptacle support 840 may be operable to supportably engage the receiving receptacle 880. In this regard, once the receiving receptacle 880 has been received 904 at the receptacle support 840, the receiving receptacle 880 may be at least partially restrained so as to prevent undesired movement thereof, such as accidental or unintended movement including tipping, rolling, or other undesired movement of the receiving receptacle 880 during the compounding. For instance, the receptacle support 840 may be correspondingly shaped so as to supportably engage the receiving receptacle 880 to prevent unintended movement thereof.

The method 900 may also include obtaining 906 an indication of an identity of the receiving receptacle 880. As described above, this may include reading a machine-readable indicia provided with the receiving receptacle 880. The obtaining 906 may be facilitated by utilization of a reader 870 at the compounder 800. Additionally or alternatively, the obtaining 906 may include manually receiving information related to the receiving receptacle 880 by a user by way of a user input 860. In this regard, the information obtained 906 may be compared (e.g., to stored data at the compounder or stored data accessed remotely by the compounder) to information regarding the receiving receptacle 880. If the information obtained 906 does not correspond with the information regarding the receiving receptacle 880, the compounder 800 may generate an alert and/or become disabled until valid information is received. As such, the potential for compounding using an inappropriate or incorrect receiving receptacle may be reduced. Furthermore, the method 900 may include verifying 908, in the case of a multichambered receiving receptacle 880 that is to be activated prior to delivery of an additive thereto, that a seal separating chambers of the receptacle 880 has been defeated. In this regard, the verifying 908 may include scrutinizing the receiving receptacle 880 using receptacle activation sensor 844 as described above.

Also as described above, the method 900 may include measuring 910 a beginning property of the receiving receptacle 880. For example, any measurable physical property of the receiving receptacle 880 may be measured 910. For example, in an embodiment, the load cell 842 may be operable to determine a weight of the receiving receptacle 880. The compounder 800 may retrieve from memory 820 and expected beginning property corresponding to the receiving receptacle 880. The method 900 may include comparing 912 the measured beginning property of the receiving receptacle 880 to the expected beginning property of the receiving receptacle 880. The comparing 912 may assist in determining whether the receiving receptacle 880 received by the receptacle support 840 is in fact the receiving receptacle 880 intended to be used in the preparation to be compounded. For instance, if the measured beginning property is different than (e.g. outside an acceptable range of deviation of the expected beginning property), the compounder 800 may generate an alert or other indication to check and/or replace the receiving receptacle 880 with a replacement receiving receptacle 880 and/or a correct receiving receptacle 880. Examples of an acceptable range of deviation may include a measured beginning property within about 1%, within about 2%, within about 5%, or even within about 10% of the expected beginning property of the receiving receptacle 880.

Furthermore, the compounder 800 may include in memory 820 a stored headspace volume measure corresponding to the receiving receptacle 880. The headspace volume measure may correspond to the difference between the total predetermined available volume of the receiving receptacle 880 and the sum of all volumes of the components (e.g., the total amount of premix solution in the receiving receptacle 880) prior to delivery of any additives into the receiving receptacle 880. That is, the headspace volume measure may correspond to an available additional volume for which the receiving receptacle 880 has capacity to receive additives. As may be appreciated, the total predetermined available volume may be an amount based on the ability of the receiving receptacle 880 to contain additional volume, and/or may be a set predetermined value established by a manufacturer of the premix solution and/or the receiving receptacle manufacturer. In this regard, the predetermined total available volume may not correspond the total volumetric capacity of the receiving receptacle 880.

In any regard, upon receiving an indication of the receiving receptacle 880 to be used in the preparation, the compounder 800 may access the memory 820 (e.g., and/or a remote memory location) to retrieve a headspace volume measure for the receiving receptacle 880. Furthermore, the compounder 800 may be operative to verify 914 the availability of an appropriate headspace volume measure by comparing the headspace volume measure to the sum of all the additive volumes to be added to the receiving receptacle 880. In this regard, the compounder 800 may be operable to verify 918 that the total amount of additives to be added to the receiving receptacle 880 may be accommodated by the receiving receptacle 880. In the event that the total amount of additive to be added to the receiving receptacle 880 exceeds the headspace volume measure for the receiving receptacle 880, the method 900 may include alerting 916 a user with respect to the insufficient headspace volume available in the receiving receptacle 880. Accordingly, appropriate action such as modification of the receiving receptacle 880 to be used in the preparation and/or re-determining the preparation amounts may be undertaken.

The process 900 may also include establishing 918 fluid interconnection between a delivery port 834 of the compounder 800 and the receiving receptacle 880. In this regard, the fluid interconnection may be provided by way of a tubing set that may extend from the receiving receptacle 882 delivery port 834 of the compounder 800. In an embodiment, the receiving receptacle 880 may also comprise an administration receptacle from which the resulting preparation is administered to the patient. In an embodiment, the tubing set utilized to provide fluid interconnection between the receiving receptacle 880 and the delivery port 834 may be the same tubing set utilized in the administration of the preparation. Alternatively, the compounding tubing set may be removed (e.g., fluidly disconnected) from the receiving receptacle and an administration tubing set for administration of the preparation to the patient may be fluidly interconnected to facilitate administration to the patient. In an embodiment, the compounding set of tubing may be reused for a plurality of preparations (e.g., corresponding with different requested therapies for potentially more than one patient). That is, with proper sterile protocol, the compounding tubing set may be reused. However, the compounding tubing set may be replaced at predetermined intervals such as a predetermined number of preparations or a predetermined temporal period. In any regard, the compounding tubing set may be uniquely adapted for use (e.g., sized, shaped, etc.) for interconnection with a delivery port 834 of the compounder.

The method 900 may also include establishing 920 fluid interconnection with corresponding ones of the additive receptacles 882 and input ports 832 of the compounder 800. For example, additive receptacle 882a may be fluidly interconnected to an input port 832a, additive receptacle 882b may be fluidly interconnected to an input port 832b, and additive receptacle 882c may be fluidly interconnected to an input port 832c. While three added receptacles 882 corresponding input ports 832 are shown and described herein, it may be appreciated that a different number (e.g., additional or fewer) additive receptacles 882 may be provided in fluid interconnection with the compounder 800. For example, in an embodiment, 12, 24, or even more additive receptacles 882 may be provided in fluid interconnection with the compounder 800. As may be appreciated, the compounder 880 may be operable to selectively control the flow of corresponding additives independently from each of the additive receptacles 882 in fluid interconnection with the compounder 800 (e.g., by controlling the flow controller 830).

In this regard, the method 900 may also include controlling 922 the flow of at least one additive from appropriate additive receptacle 882 to the receiving receptacle 880. In this regard, the controlling 922 may be facilitated by selective control of the flow controller 830 by the processor 810 of the compounder 800. That is, the processor 810 may be operable to selectively control the flow control device 830 to deliver 924 an appropriate amount of the additive to the receiving receptacle 880 (e.g., in an amount as indicated by the manifesto). It may also be appreciated that the processor 810 may be operable to determine appropriate order or sequence in which to add various ones of the additives to reduce potential interactions between additives being added to the receiving receptacle 880. For example, rules regarding sequence, order, and/or compatibility of various additives may be stored locally in the memory 820 or be remotely access by way of network interface 850 by the processor 810 to establish the appropriate sequence in to add the various additives. As may be appreciated, the delivering 924 may include delivering each of the additives indicated in the manifest in a corresponding amount indicated by the manifest to the receiving receptacle 880 until all additives indicated by the manifest have been delivered to the receiving receptacle 880. Additionally, the delivering 924 may include utilization of flushes between respective additive conditions. In this regard, the flushes may include an inert flush solution such as saline or the like that may be used to separate additive additions into the receiving receptacle 800 and/or flush and additive from plumbing of the controller 800. In this regard, the amount of flushing solution may be considered in any calculation dependent on the total amount of additives added to the receiving receptacle.

Upon delivery of all the additives as indicated by the manifest to the receiving receptacle 880, the method 900 may include measuring 926 an ending property of the receiving receptacle 880. For example, the ending property may be a weight of the receiving receptacle 880 after receiving the additive amounts as indicated by the manifest. In this regard, the method 900 may also include comparing 928 the measured ending property of the receiving receptacle 880 to an expected ending property of the receiving receptacle 880. For example, the expected ending property of the receiving receptacle 880 may corresponding to the sum of the beginning property of the receiving receptacle 880 the weight of each addition of an additive. In addition to measuring and ending property of the receiving receptacle 880, intermediate properties may also be measured (e.g., such as the weight of the receiving receptacle 880 after each subsequent addition of an additive thereto).

As described above, the receiving 902 of the manifest at the compounder may be facilitated manually by way of manual user inputs at the user interface 860 of the compounder 800. Further still, the manifest may include machine-readable data that may be receipt of the compounder (e.g., by way of the network interface 850). In this regard, the compounder 800 may be networked with a system for generation of the manifest output corresponding to a preparation to be compounded by the compounder 800. As such, the following discussion details embodiments of systems and methods that may be utilized to determine a manifest output including an amount of an additive to be added to a premix solution to generate a preparation to be administered to a patient in accord with requested therapy. As such, it may be appreciated that the following disclosure may be, in at least some embodiments, utilized in conjunction with the foregoing embodiments described of the compounder 800.

Figure 2:
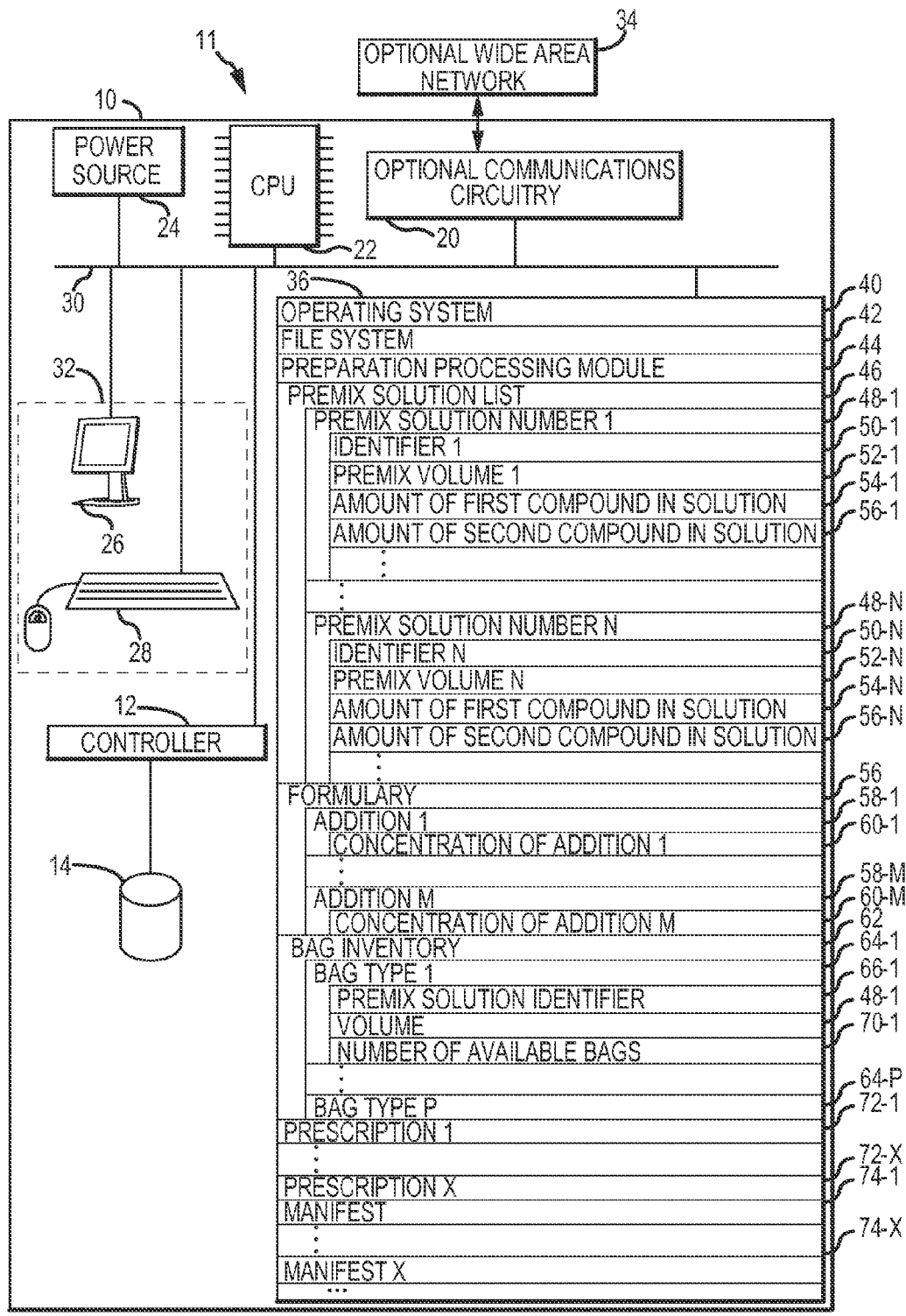
FIG. 2 is a block diagram of a computer system for executing an application (e.g., computer readable program code stored in non-transitory computer readable medium that is executable by a processor) that fills a prescription according to certain embodiments.

For example, FIG. 2 is a block diagram of a computing network 11 for executing an application that may determine an amount of an ingredient for a preparation (e.g., for use in filling a prescription or fulfilling an order) in accordance with an embodiment of the present disclosure. Thus, while the follow discussion may describe the particular context of determining an amount of an ingredient for a prescription, the disclosure may be generally applicable to determination of an amount for an ingredient of any preparation for any requested therapy, such as a prescription or an order. In any regard, the computing network 11 preferably comprises a computer system 10 having:

one or more central processing units 22;
  a main non-volatile (non-transitory) storage unit 14, for example a hard disk drive, for storing software and data, the storage unit 14 controlled by storage controller 12;
  a system memory 36, preferably high speed random-access memory, such as DRAM, SRAM, DDR RAM or other random access solid state memory devices, for storing system control programs, data, and application programs, comprising programs and data loaded from non-volatile storage unit 14; system memory 36 may also include read-only memory (ROM);
  a user interface 32, comprising one or more input devices (e.g., keyboard 28, a mouse) and a display 26 or other output device;
  optionally, a network interface card 20 (communications circuitry) for connecting to any wired or wireless communication network 34 (e.g., a wide area network such as the Internet);
  a power source 24 to power the aforementioned elements; and
  one or more communication buses 30 for interconnecting the aforementioned elements of the system.

It will be appreciated that computer system 10 may be part of an apparatus such as a compounder 800. In this regard, the compounder 800 may embody the computer system 10 such that the compounder 800 may both determine the additive amounts to be added to a premix solution for a preparation and in turn compound the preparation as determined. Alternatively, the computer system 10 may be provided independently for determining an amount of an ingredient for a preparation and a resulting manifest output may be communicated to the compounder 800. Furthermore, in some embodiments, the computer system 10 is a tablet or handheld computer and memory 14 is a memory chipset and there is no controller 12. The one or more communication buses 30 may include circuitry, also referred to as a chipset that interconnects and controls communications between system components. Memory 36 may include high speed random access memory such as DRAM, SRAM, DDR RAM or other random access solid state memory devices. Memory 14 may include mass storage that is remotely located from the one or more central processing units 22. Memory 36, or alternately the non-volatile memory devices within memory 36, comprises a non-transitory computer readable storage medium as described above. In some embodiments, memory 36 or the computer readable storage medium of memory 36 stores the following program of instructions, modules and data structures, or a subset thereof:

operating system 40, which is executed by one or more central processing units 22, comprising instructions for controlling operation of computer 10;
a file system 42 comprising instructions for controlling access to the various files and data structures;
a preparation processing module 44 comprising instructions for determining an amount of an ingredient for a preparation for use in filling a prescription;
a premix solution list 46 comprising a plurality of premix solutions where, for each respective premix solution 48 in the plurality of premix solutions, the premix solution list 46 comprises: (i) an identifier 50 for the respective premix solution 48, (ii) a premix volume 52 of the respective premix solution, (iii) an amount of a first compound 54 in the respective premix solution, and (iv) an amount of a second compound 56 in the respective premix solution;
a formulary 56 comprising a plurality of additions 58, wherein the formulary comprises a formulary concentration 60 for each respective addition 58 in the plurality of additions;
a bag inventory 62 that details a number of bag types and, for each bag type 64, the premix solution identifier 66, the volume 68 of the bag, and the number of available bags 70 in the stock on hand;
one or more prescriptions 72 to be filled; and
one or more manifest 74, each manifest corresponding to a prescription 72 and comprising instructions for filling the prescription using bags from the bag inventory and additions 58 from the formulary 56 that may be communicated to a compounder 800 for compounding of the preparation.

As used herein, the term "premix solution" may refer to a solution comprising an amount of a first compound 54 and/or an amount of a second compound 56 that was purchased or otherwise obtained in a state in which the full set of ingredients of the solution are present in the purchased or otherwise obtained product. As such, a "premix solution" is a solution that does not require the addition of components of the solution, because they have already been included in the solution at some predetermined time prior to obtaining or purchasing the premix solution.

In some embodiments, the programs of instructions or modules identified above correspond to sets of instructions for performing a function described above. The sets of instructions can be executed by one or more processors (e.g., processors 22). Each of the above-identified elements may be stored in one or more of the previously mentioned memory devices, and corresponds to a set of instructions for performing a function described above. That is, the memory 36 may include one or more of the above-identified elements in a predefined and/or predetermined manner prior to execution to perform a function described above. The above-identified modules or programs (i.e., sets of instructions) need not be implemented as separate software programs, procedures or modules, and thus various subsets of these modules may be combined or otherwise re-arranged in various embodiments. In some embodiments, memory 36 may store a subset of the modules and data structures identified above. Furthermore, memory 36 may store additional modules and data structures not described above. For instance, patient identifying data such as a patient ID code and patient type (e.g., premature, neonatal, pediatric or adult, etc).

As illustrated in FIG. 2, computer 10 comprises data such as premix solution list 46, formulary 56, and bag inventory 62. Such data can be stored in any form of data storage system including, but not limited to, a flat file, a relational database (SQL), or an on-line analytical processing (OLAP) database (e.g., MDX and/or variants thereof). In some embodiments, premix solution list 46, formulary 56, and bag inventory 62 is stored in a single database. In other embodiments, premix solution list 46, formulary 56, and bag inventory 62 in fact are stored in a plurality of databases that may or may not all be hosted by the same computer 10. In such embodiments, some components of premix solution list 46, formulary 56, and bag inventory 62 are stored on computer systems that are not illustrated by FIG. 2 but that are addressable by wide area network 34.

FIG. 5 illustrates a more detailed example of a premix solution list 46 in accordance with an aspect of the disclosure. In the exemplary premix solution list 46, there are 45 different identifiers 50, which identify 45 different premix solution possibilities. In some embodiments, a premix solution 48 includes an associated premix volume 52 such that specification of the premix solution 48, by itself, also specifies a volume of the premix solution as illustrated in FIG. 5. In such embodiments, a user requests a premix solution identifier 50. When this is done, a predetermined amount (e.g., volume) of the identified premix solution is selected. In other embodiments, the premix volume 52 is independent of the premix solution identifier 50. In such embodiments, a user requests a premix solution identifier 50 and also specifies a volume 52. For example, a user may specify a volume, or parameters to determine a volume (e.g., infusion rate and duration parameters), that corresponds with or is otherwise determined utilizing a volume of the corresponding premix solution that the user desires to infuse.

For each premix solution 50 in the exemplary premix solution list 46 of FIG. 5, there is an amount of a first compound 54 in solution that is amino acids in units of grams and an amount of a second compound 56 in solution that is dextrose in units of grams. In the exemplary premix solution list 46 of FIG. 5, the amount of amino acids and the amount of dextrose are also respectively equivalently expressed in units of Kcal (502, 504). In the exemplary premix solution list 46 of FIG. 5, the total Kcal count 506 of each premix solution 48 is also given. As further illustrated in FIG. 5, there is no requirement that each of the premix solutions 48 include the same number of compounds. Indeed, as illustrated in FIG. 5, solutions 44 and 45 include the electrolytes $Na^+$ (508), $K^+$ (510), $Mg^+$ (512), $Ca^+$ (514), $Ac^-$ (516), $Cl^-$ (518), and $PO_4^{2-}$ (520).

FIG. 6 illustrates a more detailed example of a predetermined formulary 56 in accordance with an aspect of the disclosure. In the exemplary formulary 56, there are 7 different additions 58 (e.g., corresponding to different potential ingredients, compounds, or other additions for addition to a premix solution). For each addition 58, a concentration 60 is specified.

Figure 3:
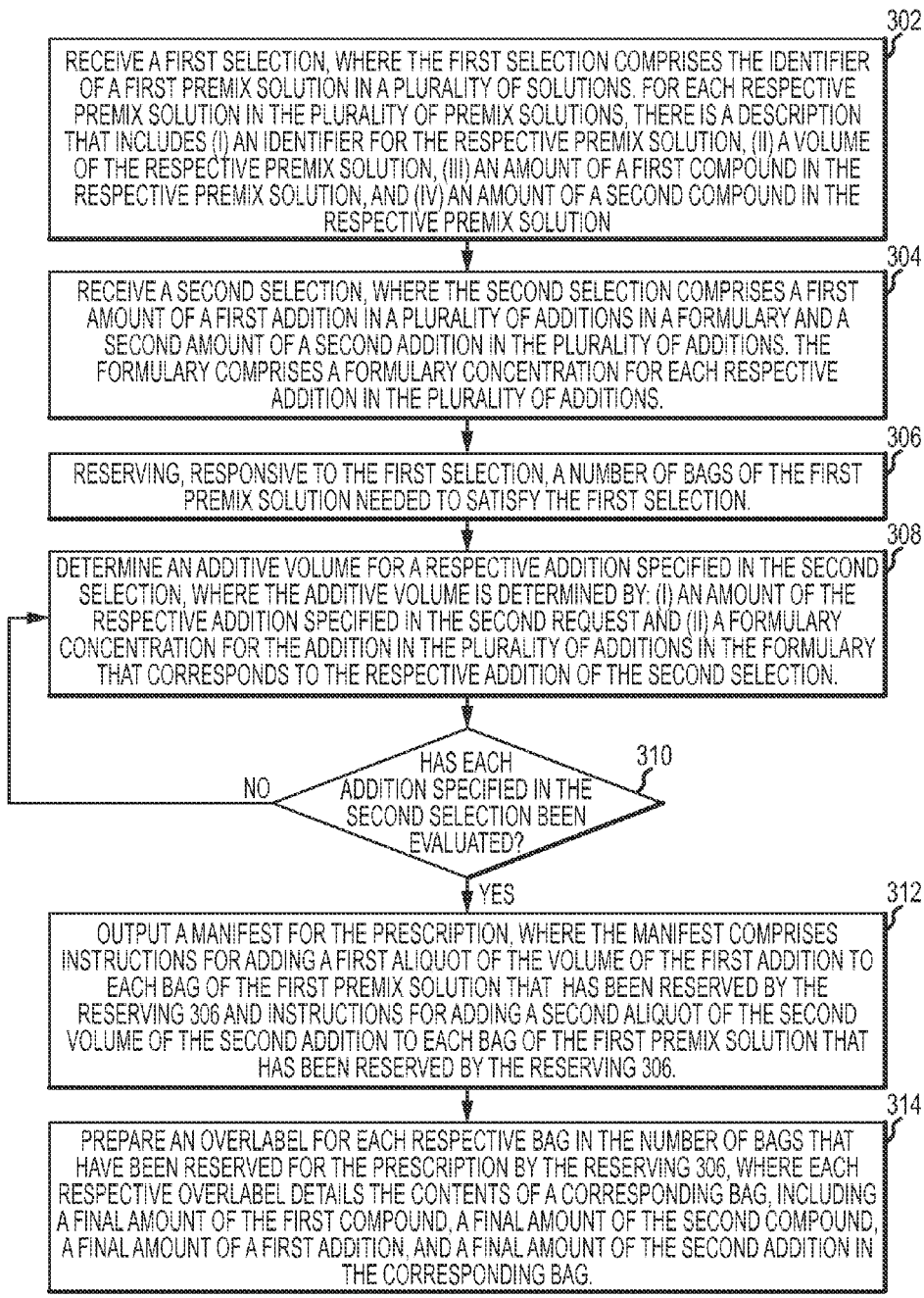
FIG. 3 is a flow diagram illustrating an example of a process performed by a computer system for filling a prescription in accordance with some embodiments.

FIG. 3 is a flow diagram illustrating an exemplary process performed by a computer system 10 for determining an amount of an ingredient for a preparation for filling a prescription 72 in accordance with certain embodiments. Referring to FIG. 2, in some embodiments, some or all of the steps set forth below in conjunction with FIG. 3 are performed by prescription processing module 44 using premix solution list 46, formulary 56, and bag inventory 62.

Step 302. In step 302 a first selection is received. The first selection comprises the identifier 50 of a premix solution 48 in a list (plurality) of premix solutions 46 to be used. In some embodiments, the identity of the premix solution 48 is inferred from a prescription 72 that does not explicitly identify the premix solution 48. In such embodiments, step 302 comprises receiving the prescription 72 and determining a suitable premix solution 48 to use in a premix solution list 46. In some embodiments, a premix solution is deemed suitable when it minimizes waste relative to other available premix solutions. In some embodiments, a premix solution is deemed suitable when it minimizes fluid load on a subject relative to other available premix solutions. In some embodiments, a premix solution is deemed suitable when it minimizes costs relative to other available premix solutions. In some embodiments, a premix solution is deemed suitable when it is compatible with other components of a prescription. In some embodiments, In some embodiments, a premix solution is deemed suitable based on some function of patient fluid load, waste, cost, and/or compatibility.

In some embodiments, a premix solution 48 includes an associated premix volume 52 such that specification of the premix solution 48, by itself, also specifies a volume of the premix solution. In such embodiments, the first selection includes only the premix solution identifier 50. In other embodiments, the premix volume 52 is independent of the premix solution identifier 50. In such embodiments, the first selection includes both a premix solution identifier 50 and also specifies a volume 52. For example, a user may specify a volume, or parameters to determine a volume (e.g., infusion rate and duration parameters), that corresponds with or is otherwise determined utilizing a volume of the corresponding premix solution that the user desires to infuse.

Referring to FIG. 4A, in some embodiments the receiving step 302 is accomplished when a prescription 72 that specifies a premix solution identifier 50 is received. The premix solution identifier 50 specifies which premix solution number 48 in the premix solution list 46 is to be used and the amount 204 of the premix solution number 48 to be used. The prescription 72 may be received by computer 10 electronically (e.g., across optional wide area network 34 or entered manually by a keyboard 28).

For each respective premix solution in the plurality of premix solutions, there is a description that includes: (i) an identifier for the respective premix solution, (ii) a volume of the respective premix solution, (iii) an amount of a first compound in the respective premix solution, and (iv) an amount of a second compound in the respective premix solution. In some embodiments, the first compound is an amino acid and the second compound is dextrose or carbohydrate.

Nonlimiting examples of premix solutions 48 are provided in FIGS. 1A and 1B. In FIGS. 1A and 1B, each row represents a different possible nonlimiting example of a premix solution 48. As illustrated in FIG. 1A, exemplary premix solutions 48 contain between 5% (g/100 ml) and 25% (g/100 ml) dextrose hydrous and between 2.75% (g/100 ml) and 5% (g/100 ml) amino acids. An exemplary premix solution in accordance with the present application comprises between 3% (g/100 ml) and 30% (g/100 ml) dextrose hydrous and one, two, three, four, five, six, seven, eight, nine, ten, eleven, twelve, or thirteen or more of the following amino acids within the specified concentration ranges: between 50 g/100 ml and 250 g/100 ml leucine, between 50 g/100 ml and 200 g/100 ml isoluecine, between 50 g/100 ml and 200 g/100 ml valine, between 50 g/100 ml and 200 g/100 ml lysine, between 50 g/100 ml and 200 g/100 ml phenylalanine, between 50 g/100 ml and 250 g/100 ml histidine, between 50 g/100 ml and 200 g/100 ml threonine, between 50 g/100 ml and 250 g/100 ml methionine, between 25 g/100 ml and 90 g/100 ml tryptophan, between 50 g/100 ml and 800 g/100 ml alanine, between 50 g/100 ml and 450 g/100 ml arginine, between 100 g/100 ml and 350 g/100 ml glycine, between 100 g/100 ml and 300 g/100 ml proline, between 50 g/100 ml and 250 g/100 ml serine, and between 5 g/100 ml and 15 g/100 ml tyrosine.

An example of a specific premix solution 48 is the CLINIMIX 2.75/5 sulfite-free injection of FIG. 1A which contains 5 g/100 ml dextrose hydrous, 201 g/100 ml leucine, 165 g/100 ml isoluecine, 160 g/100 ml valine, 159 g/100 ml lysine, 154 g/100 ml phenylalanine, 132 g/100 ml histidine, 116 g/100 ml threonine, 110 g/100 ml methionine, 50 g/100 ml tryptophan, 570 g/100 ml alanine, 316 g/100 ml arginine, 283 g/100 ml glycine, 187 g/100 ml proline, 138 g/100 ml serine, and 11 g/100 ml tyrosine.

In some embodiments, a volume of the respective premix solution 48 is either one or two liters. In some embodiments, a volume of the respective premix solution is any predetermined volume between 100 ml and 2.5 L (e.g., 100 ml, 200 ml, 300 ml, 400 ml, 500 ml, 600 ml, 700 ml, 800 ml, 900 ml, 1000 ml, 1100 ml, 1200 ml, 1300 ml, 1400 ml, 1500 ml, 1600 ml, 1700 ml, 1800 ml, 1900 ml, 2000 ml, 2100 ml, 2200 ml, 2300 ml, 2400 ml, or 2500 ml).

Step 304. In step 304, a second selection is received. The second selection comprises a first amount of a first addition 58 in a plurality of additions in a formulary 56 and a second amount of a second addition 58 in the plurality of additions. The formulary 56 comprises a formulary concentration 60 for each respective addition in the plurality of additions. Each addition 58 in the plurality of additions is available in a specific concentration 60 listed in the formulary. In some embodiments, there is more than one available concentration 60 for a given addition 58. In some embodiments, the formulary concentration 60 for an addition 58 in the plurality of additions is stored in the formulary 56 in unit dose form, milli-equivalent per milliliter form, g/ml form, percent w/v form, percent v/v form, mEq form, mg form, mcg form, IU form, or ml form. In some embodiments, an addition 58 in the plurality of additions is a medication, a trace element, a vitamin, an electrolyte, or an IV lipid emulsion.

Referring to FIG. 4A, in some embodiments the receiving step 304 is accomplished when a prescription 72 that specifies a premix solution identifier 50 that specifies which premix solution number 48 in the premix solution list 46 is to be used and the amount 204 of the premix solution number 48 to be used. To satisfy step 304, the prescription further includes an identifier 58-X of a first addition and an identifier 58-Y of a second addition as well as an amount 206-1 of the first addition and an amount 206-2 of the second addition. As illustrated in FIG. 4A, the prescription may include additional identifiers 58 for additional amounts 206 of additions in the formulary 56. The prescription 72 may be received by computer 10 electronically (e.g., across optional wide area network 34 or entered manually by a keyboard 28).

Step 306. In step 306, a number of bags of the premix solution needed to satisfy the first selection may be reserved. Referring to FIGS. 2 and 4A, this is accomplished by determining the bag type 64 that contains the premix solution 48 identified by the premix solution identifier 50 and comparing the volume 68 of such bags to the amount of premix solution 204 specified in the first selection. For example, if the amount of premix solution 204 specified in the first selection is 1400 ml and the volume 68 of the corresponding bag type 64 is 1000 ml, two bags are reserved. In general, the number of bags that are reserved in step 306 is determined by rounding the quotient obtained by the division of (i) the amount of premix solution 204 specified in the first selection by (ii) the volume 68 of the corresponding bag type 64, and rounding this quotient to the next highest integer.

In optional embodiments, as part of the reserving step 306, a check is made to ensure that a sufficient number of bags of the type needed are available. As illustrated in FIG. 2, bag inventory 62 tracks the number of available bags 70 for each bag type 64. In some embodiments, when the number of available bags is not sufficient, an error condition is called. In some embodiments, this error condition is communicated to a user thereby allowing for the possibility of physically obtaining more bags of the bag type 64 for which there is a shortage in order to fulfill the prescription. In some embodiments, this error condition is communicated to a user and the prescription is not filled until it is resubmitted, presumably at a later date when the bag inventory has been replenished.

In some embodiments, prescription processing module 44, or some equivalent process, periodically polls the number of available bags 70 for each bag type 64 and communicates a report to a user of the number of available bags 70 for each bag type 64. In some embodiments, prescription processing module 44, or some equivalent process, periodically polls the number of available bags 70 for each bag type 64 and communicates a warning when the number of available bags 70 for a given bag type 64 is low. In some embodiments, a determination is made that the number of available bags 70 for a given bag type 64 is low based on a historical usage of such bags. In some embodiments, a determination is made that the number of available bags 70 for a given bag type 64 is low based upon the specific premix solution amounts required to fill a queue of prescriptions 72 that have been submitted to system 11 for filling.

In some embodiments, a bag that is reserved for the prescription comprises a first chamber and a second chamber that are combined to form a single chamber prior to administering to a patient. In some such embodiments, the first chamber holds a dextrose or carbohydrate solution and the second chamber holds one or more amino acids in solution. In some embodiments, the first chamber holds a dextrose or carbohydrate solution and the second chamber holds a solution that comprises leucine. In some embodiments, the first chamber holds an amount of dextrose such that, when the first and second chamber are combined, the resulting premix solution 48 has between 5 and 25 (g/100 ml) dextrose. In some embodiments, the second chamber holds an amount of amino acids such that, when the first and second chamber are combined, the resulting premix solution has between 2.75 (g/100 ml) and 5.00 (g/100 ml) amino acids. In a typical sequence of events, the first and second chambers are combined and then the two or more additions are added to the bag. Then the bag is administered to a patient. Examples of premix solutions suitable for the two chamber bag are the CLINIMIX solutions of FIG. 1A.

In some embodiments, a bag in the number of bags comprises a first chamber, a second chamber and a third chamber that are each combined to form a single chamber prior to administering to a patient. In some such embodiments, the first chamber holds a dextrose or carbohydrate solution, the second chamber holds an amino acid solution, and the third chamber holds a lipid emulsion. In some embodiments, the first chamber holds a dextrose or carbohydrate solution, the second chamber holds a solution comprising leucine, and the chamber holds a solution comprising sodium. In some embodiments, the first chamber contains an amount of dextrose or carbohydrate such that when the three chambers combine the resulting premix solution 48 comprises between 5% (g/100 ml) and 25% (g/100 ml) dextrose, the second chamber contains an amount of amino acids such that when the three chambers combine the resulting premix solution 48 comprises between 2.75% (g/100 ml) and 5.00% (g/100 ml) amino acids, and the third chamber contain an amount of total nitrogen such that when the three chambers combine, the resulting premix solution 48 comprises between 454 and 702 (mg/100 ml) total nitrogen. In some embodiments, the first chamber contains an amount of dextrose or carbohydrate such that when the three chambers combine the resulting premix solution 48 contains between 3 and 30% (g/100 ml) dextrose, the second chamber contains an amount of amino acids such that when the three chambers combine the resulting premix solution 48 comprises between 2.00% (g/100 ml) and 5.50% (g/100 ml) amino acids, and the third chamber contains an amount of total nitrogen such that when the three chambers combine the resulting premix solution 48 comprises between 300 and 800 (mg/100 ml) total nitrogen. Examples of premix solutions suitable for the three chamber intravenous bag are the CLINIMIX E solutions of FIG. 1B. In some embodiments, the third chamber contains amounts of sodium acetate trihydrate, dibasic potassium phosphate, sodium chloride, and magnesium chloride calcium chloride dehydrate such that, when the three chambers combine, the resulting premix solution 48 comprises between 100 (mg/100 ml) and 400 (mg/100 ml) sodium acetate trihydrate, between 100 (mg/100 ml) and 300 (mg/100 ml) dibasic potassium phosphate, between 50 (mg/100 ml) and 150 (mg/100 ml) sodium chloride, between 25 (mg/100 ml) and 100 (mg/100 ml) magnesium chloride, and/or between 25 (mg/100 ml) and 100 (mg/100 ml) calcium chloride dehydrate. In a typical sequence of events, the three chambers are combined and then the two or more additions are added to the intravenous bag. Then the intravenous bag is administered to a patient. Examples of premix solutions suitable for the three chamber intravenous bag are the CLINIMIX E solutions of FIG. 1B.

Step 308. An additive volume for a respective addition 58 specified in the second selection is determined. In some embodiments, the additive volume may be determined by at least: (i) an amount 206 of the respective addition 58 specified in the second request and (ii) a formulary concentration 60 for the addition 58 in the plurality of additions in the formulary 56 that corresponds to the respective addition 58 of the second selection. For instance, consider the case where the desired amount 206 of the respective addition is 500 mg and the formulary concentration 60 of the addition 58 is 100 mg/ml. In this case, the additive volume is 500 mg×(1 ml/100 mg)=5 ml.

Step 310. In step 310, a determination may be made as to whether each addition 58 specified in the second selection has been evaluated. If so (310-Yes), process control continues to step 312. If not (310-No), process control returns to step 308. In some embodiments, the second selection comprises between 2 and 5 additions 58. In some embodiments, the second selection comprises between 3 and 10 additions 58. In some embodiments, the second selection comprises more than 5 additions 58.

Step 312. Step 312 is reached when volumes for a premix solution 48 and two or more additions 58 specified by a prescription 72 have been calculated. Moreover, what is known in step 312 may be the number of bags 70 of the premix solution 48 that will be needed to fill the prescription 72. In step 312, a manifest 74 for the corresponding prescription 72 is optionally outputted. The manifest 74 may comprise instructions for adding a first aliquot of the volume of the first addition 58-X to each bag of the premix solution 50 that has been reserved by the reserving 306. The manifest may comprise instructions for adding a second aliquot of the second volume of the second addition 58-Y to each bag of the premix solution 50 that has been reserved by the reserving 306.

In some embodiments, a draw down volume 212 may be specified by the manifest 74. For example, if the prescription calls for 1200 ml of premix solution whereas the bag inventory 62 indicates that the volume 48 of such bags is 1 L, two bags with a total draw down amount of 800 ml is required. In some embodiments, this draw down volume 212 is equally apportioned between each bag. Thus, in the immediate example, 400 ml is drawn from each of the two bags so that the two bags each contain 800 ml of premix solution, (i.e., ½ of the prescription amount of the premix solution). In some embodiments, the draw down amount is apportioned fully to the last bag. Thus, in the immediate example, 800 ml is drawn from one of the two bags so that one bag contains 1000 ml of premix solution while the other bag contains 200 ml of premix solution.

In some embodiments, the draw down amount is apportioned fully to the last bag provided that the last bag includes a minimum threshold volume of the premix solution. Thus, in the immediate example, consider the case where the minimum threshold volume of the premix solution is 500 ml. In one implementation of the example in accordance with this embodiment, 500 ml is drawn from the second of the two bags so that the second bag has the minimum 500 ml of premix solution and 300 ml is drawn from the first of the two bags so that the first of the two bags contains 700 ml of solution. In a different implementation of the example in accordance with this embodiment, 400 ml is drawn from the first of the two bags so that the first bag has 600 ml of premix solution and 400 ml is drawn from the second of the two bags so that the second of the two bags also contains 600 ml of solution.

In some embodiments, the manifest 74 may specify that the drawn down volume 212 is drawn from each bag that has been reserved for the prescription 72 prior to adding any of the additives 58. In some embodiments, one bag is required to fulfill a prescription. In some embodiments, two bags are required to fulfill a prescription. In some embodiments, three bags are required to fulfill a prescription. In some embodiments, four or more bags are required to fulfill a prescription.

In some embodiments, the manifest is outputted to a user for preparing the prescription 74. In some embodiments, the manifest is output to a compounder 800 that may interpret the manifest 74 for preparing the prescription, where the manifest 74 is output in the form of computer readable instructions for operating one or more compounder pumps (e.g., flow controller 830) of the compounder 800 in order to fill the prescription 72.

FIG. 4B illustrates an exemplary manifest 74 in accordance with an embodiment of the present disclosure in which there is either no draw down amounts or equal drawdown amounts specified for each bag. The manifest 74, which corresponds to a prescription 72 to which the manifest corresponds, details an bag type 64 that is available in the bag inventory 64. The manifest 74 indicates a number 210 of bags of the bag type that have been reserved. The manifest further details an optional bag drawdown volume 212 which is the volume of premix solution 48 within the bags that is to be drawn out of each of the bags prior to adding additions 58.

Continuing to refer to FIG. 4B, for each respective addition 58 to be added to fulfill the corresponding prescription 72, the manifest 74 includes an identifier of the respective addition 58 and a per bag aliquot volume 214 of the respective addition 58 to be added to each bag. The manifest 74 further includes a bag overlabel that is described in further detail below in the description of step 314.

FIG. 4C illustrates an exemplary manifest 74 in accordance with an embodiment of the present disclosure in which each bag is drawn down by an independent amount. As was the case of FIG. 4B, the manifest 74, which corresponds to a prescription 72 to which the manifest corresponds, details an bag type 64 that is available in the bag inventory 64. The manifest 74 indicates a number 210 of bags of the bag type that have been reserved. The manifest 74 further details a bag drawdown volume 212 for each bag. In other words, the manifest specifies an independent drawdown volume 212 for each respective bag which is the volume of premix solution 48 to be drawn from the respective bag prior to adding additions 58. For example, consider the case where the prescription 72 calls for 1200 ml of premix solution 48 whereas the bag inventory 62 indicates that the volume 48 of such bags is 1 L. Thus, two bags with a total draw down amount of 800 ml are required. If the draw down amount is apportioned fully to the second bag, then the drawdown volume 212-1 for bag 1 will be 0 ml and the drawdown volume 212-2 for bag 2 will be 800 ml so that the first bag contains 1000 ml of premix solution while the second bag contains 200 ml of premix solution.

Continuing to refer to FIG. 4B, for each respective addition 58 to be added to fulfill the corresponding prescription 72, the manifest 74 includes an identifier of the respective addition 58 and an independent per bag aliquot volume 214 of the respective addition 58 to be added to each bag. In the example given above, where the first bag contains 1000 ml of premix solution and the second bag contains 200 ml of premix solution, the per bag aliquot volume 214-1 for the first bag will be five times greater than the per bag aliquot volume 214-2 for the second bag. Continuing to refer to FIG. 4C, in instances where each bag to be used to fill a prescription 72 has an independent drawn down amount (volume) 212, the manifest 74 further includes an independent bag overlabel 216 for each bag.

Step 314. In step 314, an optional overlabel 216 for each respective bag in the number of bags that have been reserved for the prescription 72 by the reserving step 306 is prepared. Each respective overlabel 216 details the contents of a corresponding bag, including a final amount of the first compound in the premix solution, a final amount of the second compound in the premix solution, a final amount of a first addition, and a final amount of the second addition in the corresponding bag.

In some embodiments, the final amount of the first compound, the final amount of the second compound, the final amount of the first addition, and the final amount of the second addition are each independently expressed in milli-equivalent per milliliter, g/ml, percent w/v, percent v/v, milliliters, milligrams, number of unit doses, or other designated units.

In some embodiments each respective overlabel 216 details a total volume in a corresponding bag in the number of bags that have been reserved for the corresponding prescription 72. In some embodiments, each respective overlabel 216 details infusion instructions for a corresponding bag in the number of bags that have been reserved for the prescription. In some embodiments, each respective overlabel 216 specifies an expiration date for the corresponding prescription 72. In some embodiments, each respective overlabel 216 specifies an administration rate for a corresponding bag in the number of bags that have been reserved for the prescription.

The methods illustrated in FIG. 3 may be governed by programs of instructions that are stored in a computer readable storage medium and that are executed by at least one processor of at least one computer as described above. Each of the operations shown in FIG. 3 may correspond to a program of instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

In some embodiments, an overall target volume for the prescription may be specified. In some such embodiments, an additive volume for a respective addition calculated in step 308 may be determined by (iii) the overall target volume for the prescription.

In some embodiments, an overall target volume for the prescription may be specified. In some such embodiments, an additive volume for a respective addition calculated in step 308 may be determined by (iii) the overall target volume for the prescription, (iv) a volume of the premix solution used in the prescription, and (v) a volume of each other addition in the prescription. In some such instances, a volume for each respective additive in the prescription may be computed iteratively as the respective additions in the prescription are processed by instances of step 308.

In some embodiments, an overall target energy content for the prescription may be specified. In some such embodiments, an additive volume for a respective addition calculated in step 308 may be determined by (iii) the overall target energy for the prescription.

In some embodiments, an overall target energy content for the prescription may be specified. In some such embodiments, an additive volume for a respective addition calculated in step 308 may be determined by (iii) the overall target energy for the prescription, (iv) an energy content of the premix solution used in the prescription, and (v) an energy content of each other addition in the prescription. In some such instances, a volume for each respective additive in the prescription may be computed iteratively as the respective additions in the prescription are processed by instances of step 308.

In some embodiments, an overall target mass for the prescription may be specified. In some such embodiments, an additive volume for a respective addition calculated in step 308 may be determined by (iii) the overall target mass for the prescription.

In some embodiments, an overall target mass for the prescription may be specified. In some such embodiments, an additive volume for a respective addition calculated in step 308 may be determined by (iii) the overall target mass for the prescription, (iv) a mass of the premix solution used in the prescription, and (v) a mass of each other addition in the prescription. In some such instances, a volume for each respective additive in the prescription may be computed iteratively as the respective additions in the prescription are processed by instances of step 308.

In some embodiments, an additive volume for a respective addition specified in the second selection may be determined by a drug compatibility limit specified between (i) the first addition and (ii) a compound in the premix solution or another addition in the plurality of additions of the prescription.

In some embodiments, deviation tolerances to the overall target volume, overall target energy content, or overall target mass are permitted.

In some embodiments, the deviation tolerance to the overall target volume is within ±0.05 percent, within ±0.1 percent, within ±1.0 percent, within ±2.0 percent, within ±4.0 percent, within ±6.0 percent, within ±10.0 percent, or within ±20.0 percent of the specified overall target volume.

In some embodiments, the deviation tolerance to the overall target energy content is within ±0.05 percent, within ±0.1 percent, within ±1.0 percent, within ±2.0 percent, within ±4.0 percent, within ±6.0 percent, within ±10.0 percent, or within ±20.0 percent of the specified overall energy content.

In some embodiments, the deviation tolerance to the overall target mass is within ±0.05 percent, within ±0.1 percent, within ±1.0 percent, within ±2.0 percent, within ±4.0 percent, within ±6.0 percent, within ±10.0 percent, or within ±20.0 percent of the specified overall target mass.

Now that an exemplary method in accordance with the present disclosure has been given with respect to FIG. 3, examples of these processing steps will be given using the exemplary premix solution list 46 set forth in FIG. 5 and the exemplary formulary 56 set forth in FIG. 6. In these examples set forth below, the corresponding processing steps of FIG. 3 may be used so that the correspondence between the processing steps of the example and the general processing steps of FIG. 3 is easily understood. However, the use of these processing steps in the examples does not serve to limit the scope of any of the general description provided above.

First Example

Step 302. In exemplary step 302, a first selection is received. The first selection comprises the identifier of a premix solution 50 in a plurality of premix solutions (the premix solution list 46). In this example, the premix solution is solution 50-40 of FIG. 5 (CLINIMIX 2000 ml, 100 g AA, 300 g dextrose).

Step 304. In exemplary step 304, a second selection is received. The second selection comprises a first amount of a first addition 58 in the plurality of additions (formulary 56) and a second amount of a second addition 58 in the plurality of additions. In particular, the second selection includes a request for 50 g of lipid, 10 ml of MVI, 1 ml of trace elements, 20 meq of KCl, 40 meq of NaCl, 80 meq of NaAc, and 4.2 meq CaGluc.

Step 306. In exemplary step 306 and responsive to the first selection, a number of bags 64 of the premix solution needed to satisfy the first selection are reserved from the bag inventory 62. Based on the first and second selections, two one liter (1 L) bags of CLINIMIX 5/15 are used as the starting formulation. No volume is removed from the starting bag. Determinations for an amount of the additions to be added to the premix solution are then made as would be required to fulfill the prescription, as set forth below.

Step 308. In exemplary step 308, a plurality of additive volumes are determined based on the additions 58 specified in the second selection and the formulary concentrations of these additions. For instance, the plurality of additive volumes comprises a first volume, where the first volume is determined by: (i) the first amount of the first addition (50 g of lipid) and (ii) the formulary 56 concentration for the first addition in the plurality of additions in the formulary that corresponds to the first addition (20 g/100 ml). The plurality of additive volumes comprises a second volume, where the second volume is determined by: (i) the second amount of the second addition (10 ml of MVI) and (ii) the formulary concentration for the second addition in the plurality of additions in the formulary that corresponds to the second addition (unit dose/10 ml). In the present example, step 308 comprises making the calculations set forth in Table 1 below based on the amounts of additions specified in the second request and the corresponding concentrations of such additions in the exemplary formulary 56 illustrated in FIG. 6:

TABLE 1

| Addition 58 | Desired Dose | Formulary Concentration 60 | Desired Dose Converted to Volume | Total Volume to be Added to Premix Bags | Volume to be Added to Each Premix Bag | Amount Per 2 Intravenous Bags (Dose Divided 2 bags per day for Q2 or twice daily administration) |
|---|---|---|---|---|---|---|
| Lipid | 50 g | 20 g/100 ml | 250 ml | 250 ml | 125 ml | 25 g |
| MVI | 10 ml | Unit Dose | 10 ml | 10 ml | 5 ml | 5 ml |
| Trace Elements | 1 ml | Unit Dose | 1 ml | 1 ml | 0.5 ml | 0.5 ml |
| KCl | 20 meq | 2 meq/ml | 10 ml | 10 ml | 5 ml | 10 meq KCl |
| NaCl | 40 meq | 4 meq/ml | 10 ml | 10 ml | 5 ml | 20 meq NaCl |
| NaAcetate | 80 meq | 2 meq/ml | 40 ml | 40 ml | 20 ml | 40 meq Sodium Acetate |
| CaGluc | 4.2 meq | 0.465 meq/ml | 9 ml | 9 ml | 4.5 ml | 2.1 meq Calcium Gluconate |
| Total Additions | N/A | N/A | 330 ml | 330 ml | 165 ml | 165 ml |

Step 312. In exemplary step 312, a manifest 74 for the corresponding intravenous prescription 72 is output. This manifest can include, for example, overlabeling, macronutrient ingredients, micronutrient ingredients, patient identification and infusion directions. However, it may also be appreciated that the manifest need not be reduced to hard copy. For example, the manifest may include an output in the form of computer-readable data stored in a memory. Exemplary step 312 is reached when volumes for a premix solution 48 and two or more additions 58 specified by a prescription 72 have been calculated.

Moreover, what is known in step 312 is the number of intravenous bags 70 of the premix solution 48 that will be needed to fill the prescription 72. Specifically, in determining overlabeling for the manifest in this example, it has already been determined that the prescription order will use two intravenous bags of CLINIMIX 5/15 with the additions specified in the second selection being divided between bags. One bag will be infused immediately following the other bag. The total order volume is 2*1000 ml (2 CLINIMIX BAGS)+330 ml (additions 58)=2330 ml. Thus, each bag contains 1000 ml (CLINIMIX)+165 ml (½ of the additions 58) for a total volume of 1165 ml.

In determining macronutrient ingredients for the manifest in this example, the final concentration of amino acids is 50 g AA/1165 ml=4.29%. The final concentration of dextrose is 150 g dextrose/1165 ml=12.88%. The final concentration of lipids is 25 g lipids/1165 ml=2.15%.

In determining the micronutrient ingredients for the manifest in this example, the amount per bag values are determined based on Table 1 above. The per liter values are calculated according to the formula:

$$\text{Per Liter Value} = \frac{\text{Amount Per Bag Value}}{1.165 \text{ L}} = 0.86 * \text{Amount Per Bag Value}$$

Using this formula and Table 1, the values for Table 2 below are determined.

TABLE 2

| Micronutrient | Per 2 Bags (for Q2 or twice daily administration) | Per Liter | Per Day |
|---|---|---|---|
| MVI | 5 ml | 4.3 ml | 10 ml |
| Trace | 0.5 ml | 0.43 ml | 1 ml |
| K+ | 10 meq | 8.6 meq | 20 meq |
| Na+ | 60 meq | 51.6 meq | 120 meq |
| Ca++ | 2.1 meq | 1.80 meq | 4.2 meq |
| Cl− | 30 meq | 25.8 meq | 60 meq |
| Ac− | 40 meq | 34.3 meq | 80 meq |

The following considerations are made in order to determine the infusion instructions for the manifest in this example. A total volume of 2330 ml is to be infused over 24 hours:

$$\text{Infusion Rate} = \frac{\text{Infusion Volume}}{\text{Infusion Period}} = \frac{2330 \text{ ml}}{24 \text{ hrs}} = \frac{97 \text{ ml}}{\text{hr}}$$

Accordingly, each intravenous bag is infused over 12 hours consecutively (97 ml/hr), one after the other (intravenous bag 1 of 2 and intravenous bag 2 of 2/24 hour period).

Second Example

Step 302. In exemplary step 302, a first selection is received. The first selection comprises the identifier of a premix solution 50 in a plurality of premix solutions (the premix solution list 46). In this example, the premix solution is solution 50-38 of FIG. 5 (CLINIMIX 1800 ml, 90 g AA, 270 g dextrose).

Step 304. In exemplary step 304, a second selection is received. The second selection comprises a first amount of a first addition 58 in the plurality of additions (formulary 56) and a second amount of a second addition 58 in the plurality of additions. In particular, the second selection includes a request for 50 g of lipid, 10 ml of MVI, 1 ml of trace elements, 20 meq of KCl, 40 meq of NaCl, 80 meq of NaAc, and 4.2 meq CaGluc.

Step 306. In exemplary step 306 and responsive to the first selection, a number of intravenous bags 64 of the premix solution needed to satisfy the first selection are reserved from the intravenous bag inventory 62. Based on the first and second selections, two one liter (1 L) bags of CLINIMIX 5/15 are used as the starting formulation. A total of 200 ml is to be removed, 100 ml from each of the two intravenous bags. Determinations for an amount of the additions are then made as would be required to fulfill the prescription, as set forth below.

Step 308. In exemplary step 308, a plurality of additive volumes are determined based on the additions 58 specified in the second selection and the formulary concentrations of these additions. For instance, the plurality of additive volumes comprises a first volume, where the first volume is determined by: (i) the first amount of the first addition (50 g of lipid) and (ii) the formulary 56 concentration for the first addition in the plurality of additions in the formulary that corresponds to the first addition (20 g/100 ml). The plurality of additive volumes comprises a second volume, where the second volume is determined by: (i) the second amount of the second addition (10 ml of MVI) and (ii) the formulary concentration for the second addition in the plurality of additions in the formulary that corresponds to the second addition (unit dose/10 ml). In the present example, step 308 comprises making the calculations set forth in Table 3 below based on the amounts of additions specified in the second request and the corresponding concentrations of such additions in the exemplary formulary 56 illustrated in FIG. 6:

TABLE 3

| Addition 58 | Desired Dose | Formulary Concentration 60 | Desired Dose Converted to Volume | Total Volume to be Added to Introvenous Bags | Volume to be Added to Each Introvenous Bag | Amount Per Intravenous Bag (Dose Divided Equally 2 bags per day for Q2 or twice daily administration) |
|---|---|---|---|---|---|---|
| Lipid | 50 g | 20 g/100 ml | 250 ml | 250 ml | 125 ml | 25 g |
| MVI | 10 ml | Unit Dose | 10 ml | 10 ml | 5 ml | 5 ml |
| Trace Elements | 1 ml | Unit Dose | 1 ml | 1 ml | 0.5 ml | 0.5 ml |

TABLE 3-continued

| Addition 58 | Desired Dose | Formulary Concentration 60 | Desired Dose Converted to Volume | Total Volume to be Added to Introvenous Bags | Volume to be Added to Each Introvenous Bag | Amount Per Intravenous Bag (Dose Divided Equally 2 bags per day for Q2 or twice daily administration) |
|---|---|---|---|---|---|---|
| KCl | 20 meq | 2 meq/ml | 10 ml | 10 ml | 5 ml | 10 meq KCl |
| NaCl | 40 meq | 4 meq/ml | 10 ml | 10 ml | 5 ml | 20 meq NaCl |
| NaAcetate | 80 meq | 2 meq/ml | 40 ml | 40 ml | 20 ml | 40 meq Sodium Acetate |
| CaGluc | 4.2 meq | 0.465 meq/ml | 9 ml | 9 ml | 4.5 ml | 2.1 meq Calcium Gluconate |
| Total Additions | N/A | N/A | 330 ml | 330 ml | 165 ml | 165 ml |

Step 312. In exemplary step 312, a manifest 74 for the corresponding intravenous prescription 72 is outputted. This manifest can include, for example, overlabeling, macronutrient ingredients, micronutrient ingredients, and infusion directions. Exemplary step 312 is reached when volumes for a premix solution 48 and two or more additions 58 specified by a prescription 72 have been calculated.

Moreover, what is known in step 312 is the number of intravenous bags 70 of the premix solution 48 that will be needed to fill the prescription 72. Specifically, in determining overlabeling for the manifest in this example, it has already been determined that the prescription order will use two intravenous bags of CLINIMIX 5/15 with the additions specified in the second selection being divided between bags. One bag will be infused immediately following the other bag. The total order volume is 2*1000 ml (2 CLINIMIX BAGS)−200 ml (volume removed after intravenous bag activation)+330 ml (additions 58)=2130 ml. Thus, each bag contains 1000 ml (CLINIMIX)−100 ml (volume removed after activation)+165 ml (½ of the additions 58) for a total volume of 1065 ml.

In determining macronutrient ingredients for the manifest in this example, the final concentration of amino acids is 45 g AA/1065 ml=4.23%. The final concentration of dextrose is 135 g dextrose/1065 ml=12.68%. The final concentration of lipids is 25 g lipids/1065 ml=2.35%.

In determining the micronutrient ingredients for the manifest in this example, the amount per bag values are determined based on Table 3 above. The per liter values are calculated according to the formula:

$$\text{Per Liter Value} = \frac{\text{Amount Per Bag Value}}{1.065\ L} = 0.94 * \text{Amount Per Bag Value}$$

Using this formula and Table 3, the values for Table 4 below are determined.

TABLE 4

| Micronutrient | Per 2 Bags (for Q2 or twice daily administration) | Per Liter | Per Day |
|---|---|---|---|
| MVI | 5 ml | 4.7 ml | 10 ml |
| Trace | 0.5 ml | 0.47 ml | 1 ml |
| K+ | 10 meq | 9.4 meq | 20 meq |
| Na+ | 60 meq | 56.3 meq | 120 meq |
| Ca++ | 2.1 meq | 1.97 meq | 4.2 meq |
| Cl− | 30 meq | 28.2 meq | 60 meq |
| Ac− | 40 meq | 37.6 meq | 80 meq |

The following considerations are made in order to determine the infusion instructions for the manifest in this example. A total volume of 2130 ml is to be infused over 24 hours:

$$\text{Infusion Rate} = \frac{\text{Infusion Volume}}{\text{Infusion Period}} = \frac{2130\ ml}{24\ hrs} = \frac{88.8\ ml}{hr}$$

Accordingly, each intravenous bag is infused over 12 hours consecutively (88.8 ml/hr), one after the other (intravenous bag 1 of 2 and intravenous bag 2 of 2/24 hour period).

Third Example

Step 302. In exemplary step 302, a first selection is received. The first selection comprises the identifier of a premix solution 50 in a plurality of premix solutions (the premix solution list 46). In this example, the premix solution is solution 50-38 of FIG. 5 (CLINIMIX 1800 ml, 90 g AA, 270 g dextrose), and corresponds with a bag type 64 having a volume 68 of 1 L.

Step 304. In exemplary step 304, a second selection is received. The second selection comprises a first amount of a first addition 58 in the plurality of additions (formulary 56) and a second amount of a second addition 58 in the plurality of additions. In particular, the second selection includes a request for 50 g of lipid, 10 ml of MVI, 1 ml of trace elements, 20 meq of KCl, 40 meq of NaCl, 80 meq of NaAc, and 4.2 meq CaGluc.

Step 306. In exemplary step 306 and responsive to the first selection, a number of bags 64 of the premix solution needed to satisfy the first selection are reserved from the intravenous bag inventory 62. Based on the first and second selections, two one liter (1 L) bags of CLINIMIX 5/15 are used as the starting formulation. Determinations for an amount of the additions are made as would be required to fulfill the prescription, as set forth below.

Step 308. It is desired to infuse only 1800 ml (plus additive volume) of the total 2000 ml (plus additive volume) present in two (2) one liter (1 L) bags of plain CLINIMIX. As such only 90% of each CLINIMIX intravenous bag will be infused into the patient. In order to accommodate the discarding of the remaining ten percent of the bag contents, which will also include discarding a portion of the additives, additions must be increased by factor of 1.11. Thus, the following calculations are made.

Partial Infusion Factor =

$$\frac{\text{Volume in Container (without additives)}}{\text{Prescribed Volume (without additives)}} = \frac{2000 \text{ ml}}{1800 \text{ ml}} = 1.11$$

Proportioned Up Volume = Partial Infusion Factor * Prescribed Volume

For example, a prescribed 10 ml dose of MVI would be multiplied by the Partial Infusion Factor (10 ml*1.11) resulting in a Proportioned Up Volume of 11.1 ml of MVI.

Proportioned Up Volume=10 ml MVI*1.11=11.1 ml MVI

Note that the proportioned up volume takes into account the prescribed volume and the volume to be discarded. Here, the proportioned up volume consists of 10 ml of MVI intended to be delivered to the patient with an additional 1.1 ml MVI intended to be discarded.

In exemplary step 308, a plurality of additive volumes are determined based on the additions 58 specified in the second selection and the formulary concentrations of these additions. For instance, the plurality of additive volumes comprises a first volume, where the first volume is determined by the quotient of (i) the first amount of the first addition (50 g of lipid) and (ii) the formulary 56 concentration for the first addition in the plurality of additions in the formulary that corresponds to the first addition (20 g/100 ml), multiplied by the partial infusion factor. The plurality of additive volumes comprises a second volume, where the second volume is determined by the quotient of (i) the second amount of the second addition (10 ml of MVI) and (ii) the formulary concentration for the second addition in the plurality of additions in the formulary that corresponds to the second addition (unit dose/10 ml) multiplied by the partial infusion factor. In the present example, step 308 comprises making the calculations set forth in Table 5 below based on the amounts of additions specified in the second request and the corresponding concentrations of such additions in the exemplary formulary 56 illustrated in FIG. 6, in addition to the partial infusion factor:

Step 312. In exemplary step 312, a manifest 74 for the corresponding intravenous prescription 72 is outputted. This manifest can include, for example, overlabeling, macronutrient ingredients, micronutrient ingredients and infusion directions. Exemplary step 312 is reached when volumes for a premix solution 48 and two or more additions 58 specified by a prescription 72 have been calculated.

Moreover, what is known in step 312 is the number of intravenous bags 70 of the premix solution 48 that will be needed to fill the prescription 72. Specifically, in determining overlabeling for the manifest in this example, it has already been determined that the prescription order will use two intravenous bags of CLINIMIX 5/15 with the additions proportioned up and divided between the two bags. One bag will be infused immediately following the other bag. The total order volume is 2*1000 ml (2 CLINIMIX BAGS)+ 366.3 ml (additions 58)=2366.3 ml. In order to provide the patient the prescribed TPN, the following partial infusion will need to occur (i) infuse the first 1065 ml from the first 1183.15 ml bag, (ii) discard the remaining 118.15 ml from the first bag, (iii) infuse the second 1065 ml from the second 1183.15 ml bag immediately following the first bag, and (iv) discard the remaining 118.15 ml from the second bag. The patient will have received a total volume of 2130 ml (1800 ml CLINIMIX+330 ml of additive volume) as prescribed.

In determining macronutrient ingredients for the manifest in this example, the final concentration of amino acids is 50 g AA/1183.15 ml=4.23%. The final concentration of dextrose is 150 g dextrose/1183.15 ml=12.68%. The final concentration of lipids is 27.75 g lipids/1183.15 ml=2.35%.

In determining the micronutrient ingredients for the manifest in this example, the amount per bag values are determined based on Table 5 above. The per liter values are calculated according to the formula:

$$\text{Per Liter Value} = \frac{\text{Amount Per Bag Value}}{1.183 \text{ L}} = 0.845 * \text{Amount Per Bag Value}$$

Using this formula and Table 5, the values for Table 6 below are determined.

TABLE 5

| Addition | Desired Dose | Formulary Concentration | Desired Dose Converted to Volume | Total Volume to be added to CLINIMIX Bags Using Partial Infusion Factor | Volume to be added to each CLINIMIX Bag | Amount per bag (Dose Divided Equally) |
|---|---|---|---|---|---|---|
| Lipid | 50 g | 20 g/100 ml | 250 ml | 277.5 ml | 138.75 ml | 27.75 g |
| MVI | 10 ml | Unit Dose | 10 ml | 11.1 ml | 5.55 ml | 5.55 ml |
| Trace Elements | 1 ml | Unit Dose | 1 ml | 1.11 ml | 0.555 ml | 0.555 ml |
| KCl | 20 meq | 2 meq/ml | 10 ml | 11.1 ml | 5.55 ml | 11.1 meq KCl |
| NaCl | 40 meq | 4 meq/ml | 10 ml | 11.1 ml | 5.55 ml | 22.2 meq NaCl |
| NaAc | 80 meq | 2 meq/ml | 40 ml | 44.4 ml | 22.2 ml | 44.4 meq Sodium Acetate |
| CaGluc | 4.2 meq | 0.465 meq/ml | 9 ml | 9.99 ml | 4.995 ml | 2.32 meq Calcium Gluconate |
| Total Additions | N/A | N/A | 330 ml | 366.3 ml | 183.15 ml | 183.15 ml |

TABLE 6

| Micronutrient | Amount Per Bag | Amount of Dose Infused Per Bag | Per Liter | Dose Infused Per Day (per 2 bags) |
|---|---|---|---|---|
| MVI | 5.55 ml | 5 ml | 4.69 ml | 10 ml |
| Trace | 0.555 ml | 0.5 ml | 0.47 ml | 1 ml |
| K+ | 11.1 meq | 10 meq | 9.38 meq | 20 meq |
| Na+ | 66.6 meq | 60 meq | 56.28 meq | 120 meq |
| Ca++ | 2.33 meq | 2.1 meq | 1.97 meq | 4.2 meq |
| Cl- | 33.3 meq | 30 meq | 28.14 meq | 60 meq |
| Ac- | 44.4 meq | 40 meq | 37.52 meq | 80 meq |

The following considerations are made in order to determine the infusion instructions for the manifest in this example. The total volume available in both bags is 2366.3 ml. A total of 2130 ml is intended to be infused over 24 hours.

$$\text{Infusion Rate} = \frac{\text{Infusion Volume}}{\text{Infusion Period}} = \frac{2130 \text{ ml}}{24 \text{ hrs}} = \frac{88.75 \text{ ml}}{\text{hr}}$$

Accordingly, the infusion instructions of this example are to infuse intravenous bag 1 at 88.75 ml/hr for the first twelve hour period (1065 ml infused), then discard the remainder of intravenous bag 1 after the twelve hours infusion. Then infuse intravenous bag 2 at 88.75 ml/hr for the second twelve hour period (1065 ml infused). Then discard remainder of the second intravenous bag after the twelve hours infusion. (Infuse a portion of bag 1 of 2 followed by a portion of bag 2 of 2 consecutively).

It may also be appreciated based on the foregoing example that when determining additive volumes for a plurality of additions, the additive volumes for each respective one of the plurality of additions may affect the calculation of the additive volume of other additions. In this regard, an iterative process may be performed to iteratively determine the additive volume of one or more of the additions.

For example, continuing the third example and using the lipids addition as an example, the desired dose of lipids to be injected is 50 g. As determined in the first iteration described above, the additive volume of the lipids using the partial infusion factor and formulary concentration was 277.5 ml. Multiplying the additive volume by the formulary concentration reveals that a total of 55.5 g of lipids are to be added based on the volume of 277.5 ml of lipids. However, upon determining the additional additive volumes corresponding to the other additions (e.g., the MVI, trace elements, KCl, NaCl, NaAc, and CaGluc), the total final volume of the premix solution with additives added thereto would be 2366.3 ml (e.g., 2000 ml of premix solution and a total volume of 366.3 ml of additions). Thus, the final concentration of lipids present in the premix solution may be determined by dividing 55.5 g present in the solution by the total volume of 2366.3 ml to arrive at a final concentration of lipids in the solution of 0.023 g/ml of lipids. As discussed above, 2130 ml of the premix solution with additives is to be infused. In this regard, multiplying the volume to be infused by the concentration of the lipids in the solution (e.g., 2130 ml multiplied by 0.023 g/ml) reveals that a total of 48.99 g of lipids would be injected, not the specified 50 g of lipids.

In this regard, a second iteration to determine the additive volume of the lipids based on the affect of the volume of the other additives may be undertaken. For example, the final concentration of lipids required in the 2130 ml to be administered can be calculated as the 50 g of the desired dose divided by the total volume of 2130 ml or a concentration of 0.0235 g/ml. This increased concentration may be multiplied by the total volume including all of the additives determined in the first iteration (e.g., 0.0235 g/ml multiplied by 2366.3 ml) to arrive the value of 55.6 g of lipids to be added to the premix solution to account for the added volume attributed to the other additions. Using the formulary concentration, the total volume of lipids to be added now includes 278 ml of lipids as opposed to the 277.5 ml of lipids previously added. As may be appreciated, this additional volume of lipids may also affect the other calculations with respect to the additive volume for the other additions to be added to the premix solution. In this regard, the increased volume of the lipids (e.g., the increase in the total volume of the solution based on the additional lipids to be added) may be used in further iterative calculations of the other additive volumes for the other additions.

It may be appreciated that upon each successive iteration, the change in the determined additive volumes between each successive iteration for each of the additions may be reduced. In this regard, the iterative calculation process of determining the additive volume for the various admissions based on the change in total volume of the solution due to the other additions may be repeated until a steady-state values reach for each of the additive volumes, or the change in additive volumes for any or all of the additions between iterations is below a predetermined threshold (e.g., less than any of the above listed values for the deviation tolerance to overall volume), or any other appropriate metric for determining when the iterative calculations have arrived at a value with acceptable parameters. Furthermore, while one iteration of a single addition as described above, it may be appreciated that iterations with respect to other additions or further iterations may be undertaken in a similar regard as to the one described above.

Fourth Example

Step 302. In exemplary step 302, a first selection is received. The first selection comprises the identifier of a premix solution 50 in a plurality of premix solutions (the premix solution list 46). In this example, the premix solution is solution 50-45 of FIG. 5 (CLINIMIX E 2000 ml, 100 g AA, 300 g dextrose).

Step 304. In exemplary step 304, a second selection is received. The second selection comprises a first amount of a first addition 58 in the plurality of additions (formulary 56) and a second amount of a second addition 58 in the plurality of additions. In particular, the second selection includes a request for 50 g of lipid, 10 ml of MVI, 1 ml of trace elements, 237 meq Na+, 108 meq K+, 10 meq Mg$^{2+}$, 9 meq Ca$^{2+}$, 185 meq Ac-, 108 meq Cl-, and 39 mmol PO$_4^{2-}$.

Step 306. In exemplary step 306 and responsive to the first selection, a number of intravenous bags 64 of the premix solution needed to satisfy the first selection are reserved from the intravenous bag inventory 62. Based on the first and second selections, two one liter (1 L) bags of CLINIMIX 5/15 E are used as the starting formulation. No volume will be removed from the starting bag. Determinations for the amount of the additions will be made as would be required to fulfill the prescription.

Step 308. In exemplary step 308, a plurality of additive volumes are determined based on the additions 58 specified in the second selection and the formulary concentrations of these additions. For instance, the plurality of additive volumes comprises a first volume, where the first volume is determined by: (i) the first amount of the first addition (50 g of lipid) and (ii) the formulary 56 concentration for the first addition in the plurality of additions in the formulary that corresponds to the first addition (20 g/100 ml). The plurality of additive volumes comprises a second volume, where the second volume is determined by: (i) the second amount of the second addition (10 ml of MVI) and (ii) the formulary concentration for the second addition in the plurality of additions in the formulary that corresponds to the second addition (unit dose/10 ml). In the present example, step 308 comprises making the calculations set forth in Table 7 below based on the amounts of additions specified in the second request and the corresponding concentrations of such additions in the exemplary formulary 56 illustrated in FIG. 6:

Step 312. In exemplary step 312, a manifest 74 for the corresponding intravenous prescription 72 is outputted. This manifest can include, for example, overlabeling, macronutrient ingredients, micronutrient ingredients and infusion directions. Exemplary step 312 is reached when volumes for a premix solution 48 and two or more additions 58 specified by a prescription 72 have been calculated.

Moreover, what is known in step 312 is the number of intravenous bags 70 of the premix solution 48 that will be needed to fill the prescription 72. Specifically, in determining overlabeling for the manifest in this example, it has already been determined that the prescription order will use two intravenous bags of CLINIMIX E 5/15 with the additions being divided between the two bags. One bag will be infused immediately following the other bag. The total order volume is 2*1000 ml (2 CLINIMIX BAGS)+442.35 ml (additions 58)=2442.35 ml. Each bag will contain 1000 ml (CLINIMIX E)+221.18 ml (½ additions 58)=1221.18 ml total volume.

In determining macronutrient ingredients for the manifest in this example, the final concentration of amino acids is 50 g AA/1221.18 ml=4.09%. The final concentration of dextrose is 150 g dextrose/1221.18 ml=12.28%. The final concentration of lipids is 25.0 g lipids/1221.18 ml=2.05%.

In determining the micronutrient ingredients for the manifest in this example, the amount per bag values are determined based on Table 7 above. The per liter values are calculated according to the formula:

TABLE 7

| Addition | Total Desired Dose (CLINIMIX E 5/15 + Additions) | Present in CLINIMIX E 5/15/ Liter | Present in 2000 ml CLINIMIX E 5/15 | Required Addition | Formulary Concentration | Desired Dose Converted to Volume | Total Volume to be added to CLINIMIX E 5/15 Bags | Volume to be added to each CLINIMIX E 5/15 Bag | Amount per Bag (Total Desired Dose divided equally) |
|---|---|---|---|---|---|---|---|---|---|
| Lipid | 50 g | 0 | 0 | 50 g | 20 g/100 ml | 250 ml | 250 ml | 125 ml | 25 g |
| MVI | 10 ml | 0 | 0 | 10 ml | Unit Dose | 10 ml | 10 ml | 5 ml | 5 ml |
| Trace | 1 ml | 0 | 0 | 1 ml | Unit Dose | 1 ml | 1 ml | 0.5 ml | 0.5 ml |
| Na+ | 307 meq | 35 meq | 70 meq | 237 meq | | | | | 153.5 meq Na+ (35 meq + 92.5 meq + 26 meq) |
| | | | | (185 meq NaAc) | 2 meq/ml | 92.5 ml | 92.5 ml | 46.25 ml | 92.5 meq Na+ |
| | | | | (52 meq NaPhos) | 4 meq Na+/ml (3 mmol Phos/ml) | 13 ml | 13 ml | 6.5 ml | 26 meq Na+ |
| K+ | 168 meq | 30 meq | 60 meq | (108 meq KCl) | 2 meq/ml | 54 ml | 54 ml | 27 ml | 84 meq K+ (30 meq + 54 meq) |
| Mg++ | 20 meq | 5 meq | 10 meq | 10 meq (Mg Sulfate) | 4 meq/ml | 2.5 ml | 2.5 ml | 1.25 ml | 10 meq (5 meq + 5 meq) |
| Ca++ | 18 meq | 4.5 meq | 9 meq | 9 meq | 0.465 meq/ml | 19.35 ml | 19.35 ml | 9.68 ml | 9 meq (4.5 meq + 4.5 meq) |
| Ac− | 345 meq | 80 meq | 160 meq | 185 meq | from NaAc above | From NaAc above | From NaAc above | From NaAc above | 172.5 (80 meq + 92.5 meq) |
| Cl− | 186 meq | 39 meq | 78 meq | 108 meq | from KCl above | From KCl above | From KCl above | From KCl above | 93 meq (39 meq + 54 meq) |
| PO4−− | 69 mmol | 15 mmol | 30 mmol | 39 mmol | from NaPO$_4$ above | from NaPO$_4$ above | from NaPO$_4$ above | from NaPO$_4$ above | 34.5 mmols (15 mmols + 19.5 mmols) |
| Total Adds | | | | | | 442.35 ml | 442.35 ml | 221.18 ml | |

$$\text{Per Liter Value} = \frac{\text{Amount Per Bag Value}}{1221.18 \text{ L}} = 0.82 * \text{Amount Per Bag Value}$$

Using this formula and Table 7, the values for Table 8 below are determined.

TABLE 8

| Micronutrient | Amount Per Bag Total Desired Dose Divided Equally) | Per Liter | Total Desired Dose Per Day (2 CLINIMIX E Bags + Additions) |
|---|---|---|---|
| MVI | 5 ml | 4.1 ml | 10 ml |
| Trace | 0.5 ml | 0.41 ml | 1 ml |
| Na+ | 153.5 meq | 125.87 meq | 307 meq |
| K+ | 84 meq | 68.88 meq | 168 meq |
| Mg++ | 10 meq | 8.2 meq | 20 meq |
| Ca++ | 9 meq | 7.38 meq | 18 meq |
| Ac- | 172.5 meq | 141.45 meq | 345 meq |
| Cl- | 93 meq | 76.26 meq | 186 meq |
| PO4-- | 34.5 mmol | 28.29 mmol | 69 mmol |

The following considerations are made in order to determine the infusion instructions for the manifest in this example. The total volume of 2442.35 ml is intended to be infused over 24 hours.

$$\text{Infusion Rate} = \frac{\text{Infusion Volume}}{\text{Infusion Period}} = \frac{2442.35 \text{ ml}}{24 \text{ hrs}} = \frac{101.76 \text{ ml}}{\text{hr}}$$

Accordingly, the infusion instructions of this example are to infuse each bag over twelve hours consecutively (101.76 ml/hr), one after the other (bag 1 of 2 and bag 2 of 2/24 hour period).

Fifth Example

Step 302. In exemplary step 302, a first selection is received. The first selection comprises the identifier of a premix solution 50 in a plurality of premix solutions (the premix solution list 46). In this example, the premix solution is solution 50-38 of FIG. 5 (CLINIMIX 1800 ml, 90 g AA, 270 g dextrose), and corresponds with a bag type 64 having a volume 68 of 2 L.

Step 304. In exemplary step 304, a second selection is received. The second selection comprises a first amount of a first addition 58 in the plurality of additions (formulary 56) and a second amount of a second addition 58 in the plurality of additions. In particular, the second selection includes a request for 50 g of lipid, 10 ml of MVI, 1 ml of trace elements, 20 meq of KCl, 40 meq of NaCl, 80 meq of NaAc, and 4.2 meq CaGluc.

Step 306. In exemplary step 306 and responsive to the first selection, a number of bags 64 of the premix solution needed to satisfy the first selection may be optionally reserved from the intravenous bag inventory 62. In this example, based on the first selection and optionally the second selection, one two liter (2 L) bag of CLINIMIX 5/15 is used as the starting formulation.

In this regard, selection of a single two liter (2 L) bag of CLINIMIX 5/15, as opposed to two one liter (1 L) bags of CLINIMIX 5/15 may reduce the compounding steps entailed for filling a prescription as well as subsequent administration steps.

Step 308. It is desired to infuse a minimum volume of only 1800 ml (plus additive volume) of the total 2000 ml (plus additive volume) present in the one (1) two liter (2 L) bag of plain CLINIMIX. As such only 90% of the single CLINIMIX intravenous bag will be infused into the patient. In order to accommodate the discarding of the remaining ten percent of the bag contents, which will also include discarding a portion of the additives, additions must be increased by factor of 1.11. Thus, the following calculations are made.

$$\text{Partial Infusion Factor} = \frac{\text{Volume in Container (without additives)}}{\text{Prescribed Volume (without additives)}} = \frac{2000 \text{ ml}}{1800 \text{ ml}} = 1.11$$

Proportioned Up Volume = Partial Infusion Factor * Prescribed Volume

For example, a prescribed 10 ml dose of MVI would be multiplied by the Partial Infusion Factor (10 ml*1.11) resulting in a Proportioned Up Volume of 11.1 ml of MVI.

Proportioned Up Volume = 10 ml MVI*1.11 = 11.1 ml MVI

Note that the proportioned up volume takes into account the prescribed volume and the volume to be discarded. Here, the proportioned up volume consists of 10 ml of MVI intended to be delivered to the patient with an additional 1.1 ml MVI intended to be discarded.

In exemplary step 308, a plurality of additive volumes are determined based on the additions 58 specified in the second selection and the formulary concentrations of these additions. For instance, the plurality of additive volumes comprises a first volume, where the first volume is determined by the quotient of (i) the first amount of the first addition (50 g of lipid) and (ii) the formulary 56 concentration for the first addition in the plurality of additions in the formulary that corresponds to the first addition (20 g/100 ml), multiplied by the partial infusion factor. The plurality of additive volumes comprises a second volume, where the second volume is determined by the quotient of (i) the second amount of the second addition (10 ml of MVI) and (ii) the formulary concentration for the second addition in the plurality of additions in the formulary that corresponds to the second addition (unit dose/10 ml) multiplied by the partial infusion factor. In the present example, step 308 comprises making the calculations set forth in Table 9 below based on the amounts of additions specified in the second request and the corresponding concentrations of such additions in the exemplary formulary 56 illustrated in FIG. 6, in addition to the partial infusion factor:

TABLE 9

| Addition | Desired Dose | Formulary Concentration | Desired Dose Converted to Volume | Total Volume to be added to CLINIMIX Bag Using Partial Infusion Factor | Amount in bag |
|---|---|---|---|---|---|
| Lipid | 50 g | 20 g/100 ml | 250 ml | 277.5 ml | 55.5 g |
| MVI | 10 ml | Unit Dose | 10 ml | 11.1 ml | 11.1 ml |
| Trace Elements | 1 ml | Unit Dose | 1 ml | 1.11 ml | 1.11 ml |
| KCl | 20 meq | 2 meq/ml | 10 ml | 11.1 ml | 22.2 meq KCl |
| NaCl | 40 meq | 4 meq/ml | 10 ml | 11.1 ml | 88.8 meq NaCl |
| NaAc | 80 meq | 2 meq/ml | 40 ml | 44.4 ml | 88.8 meq Sodium Acetate |
| CaGluc | 4.2 meq | 0.465 meq/ml | 9 ml | 9.99 ml | 4.64 meq Calcium Gluconate |
| Total Additions | N/A | N/A | 330 ml | 366.3 ml | 366.3 ml |

Step 312. In exemplary step 312, a manifest 74 for the corresponding intravenous prescription 72 is outputted. This manifest can include, for example, overlabeling, macronutrient ingredients, micronutrient ingredients and infusion directions. Exemplary step 312 is reached when volumes for a premix solution 48 and two or more additions 58 specified by a prescription 72 have been calculated.

Moreover, what is known in step 312 is the number of intravenous bags 70 of the premix solution 48 that will be needed to fill the prescription 72. Specifically, in determining overlabeling for the manifest in this example, it has already been determined that the prescription order will use one intravenous bag of CLINIMIX 5/15 with the additions identified above. The total order volume is 2000 ml (1 CLINIMIX 2 L BAG)+366.3 ml (additions 58)=2366.3 ml. In order to provide the patient the prescribed TPN, the following partial infusion will need to occur (i) infuse the 2130 ml from the bag, (ii) discard the remaining 236.3 ml.

In determining macronutrient ingredients for the manifest in this example, the final concentration of amino acids is 100 g AA/2366.3 ml=4.23%. The final concentration of dextrose is 300 g dextrose/2366.3 ml=12.68%. The final concentration of lipids is 55.5 g lipids/2366.3 ml=2.35%.

In determining the micronutrient ingredients for the manifest in this example, the amounts are determined based on Table 9 above. The per liter values are calculated according to the formula:

$$\text{Per Liter Value} = \frac{\text{Amount In Bag Value}}{2.368 \text{ L}} = 0.845 * \text{Amount In Bag Value}$$

Using this formula and Table 9, the values for Table 10 below are determined.

TABLE 10

| Micronutrient | Amount In Bag | Amount of Dose Infused From Bag | Per Liter | Dose Infused Per Day |
|---|---|---|---|---|
| MVI | 11.1 ml | 10 ml | 4.69 ml | 10 ml |
| Trace | 11.1 ml | 1 ml | 0.47 ml | 1 ml |
| K+ | 22.2 meq | 20 meq | 9.38 meq | 20 meq |

TABLE 10-continued

| Micronutrient | Amount In Bag | Amount of Dose Infused From Bag | Per Liter | Dose Infused Per Day |
|---|---|---|---|---|
| Na+ | 133.2 meq | 120 meq | 56.28 meq | 120 meq |
| Ca++ | 4.66 meq | 4.2 meq | 1.97 meq | 4.2 meq |
| Cl− | 66.6 meq | 60 meq | 28.14 meq | 60 meq |
| Ac− | 88.8 meq | 80 meq | 37.52 meq | 80 meq |

The following considerations are made in order to determine the infusion instructions for the manifest in this example. The total volume available in the bag is 2366.3 ml. A total of 2130 ml is intended to be infused over 24 hours.

$$\text{Infusion Rate} = \frac{\text{Infusion Volume}}{\text{Infusion Period}} = \frac{2130 \text{ ml}}{24 \text{ hrs}} = \frac{88.75 \text{ ml}}{\text{hr}}$$

Accordingly, the infusion instructions of this example are to infuse the intravenous bag 1 at 88.75 ml/hr for the twenty four hour period (2130 ml infused), then discard the remainder of intravenous bag 1.

Sixth Example

In this example, computer system 10 may comprise or otherwise operatively interface with one or more programs, or applications, that facilitate the generation and entry of an order for a parenteral or enteral preparation (e.g., an order or prescription), via interactive user interface screens accessible at user interface 32. Additionally, computer system 10 may include a formulary 56 comprising both a plurality of additions 58 and one or a plurality of premix solutions 48, wherein each premix solution 48 has a corresponding identifier 50 and a corresponding bag volume 52 associated therewith. In some implementations, a premix solution identifier 50 may be selected directly or by usage of a pre-established order template stipulation inclusion of a given premix solution identifier 50, wherein upon user entry of a volume (e.g., a desired volume of premix solution to be administered to a patient), a premix solution 48 having a corresponding bag volume 52 sufficient to provide the entered volume may be automatically selected for inclusion in the preparation order.

By way of example, reference is again made to FIG. 1A and FIG. 1B, which each illustrate eight rows of different premix solutions 48, with each row including two premix solutions 48 having different bag volumes (i.e., 1000 ml and 2000 ml) and being of a common type (i.e., having common compound component concentrations). In this example, one or more of the sixteen types of premix solutions identified in FIG. 1A and FIG. 1B may be included in formulary 56, wherein each premix solution 48 has a corresponding bag volume 52 (i.e., 1 L or 2 L). In conjunction with this example, formulary 56 may include at least two premix solutions 48 of a common type (i.e., having common compound concentrations) and having different corresponding bag volumes 52 (e.g., 1 L and 2 L). A common premix solution identifier 50 may be utilized in connection with premix solutions of a common type.

Reference is now made to FIGS. 7A-7I which illustrate various prescription order entry screens that may be provided at and operatively interacted with by a user at user interface 32 of computer system 10. As shown by interactive use interface screen 400 of FIG. 7A, a formulary 56 may have a corresponding ingredient listing in scrollable ingredient listing box 402 that includes a premix solution identifier 50 for a given type of premix solution 48 (e.g., CLINIMIX E4 4.25/5 in the illustrated example). Upon selection of such premix solution identifier 50 in listing box 402, an "Ingredient Detail" portion 404 may indicate that corresponding premix solutions 48 are includable, or available, in two corresponding bag volumes (e.g., CLINIMIX E 4.25/5 in 1 L bag and CLINIMIX E 4.25/5 in 2 L bag in the illustrated example).

Figure 7A:
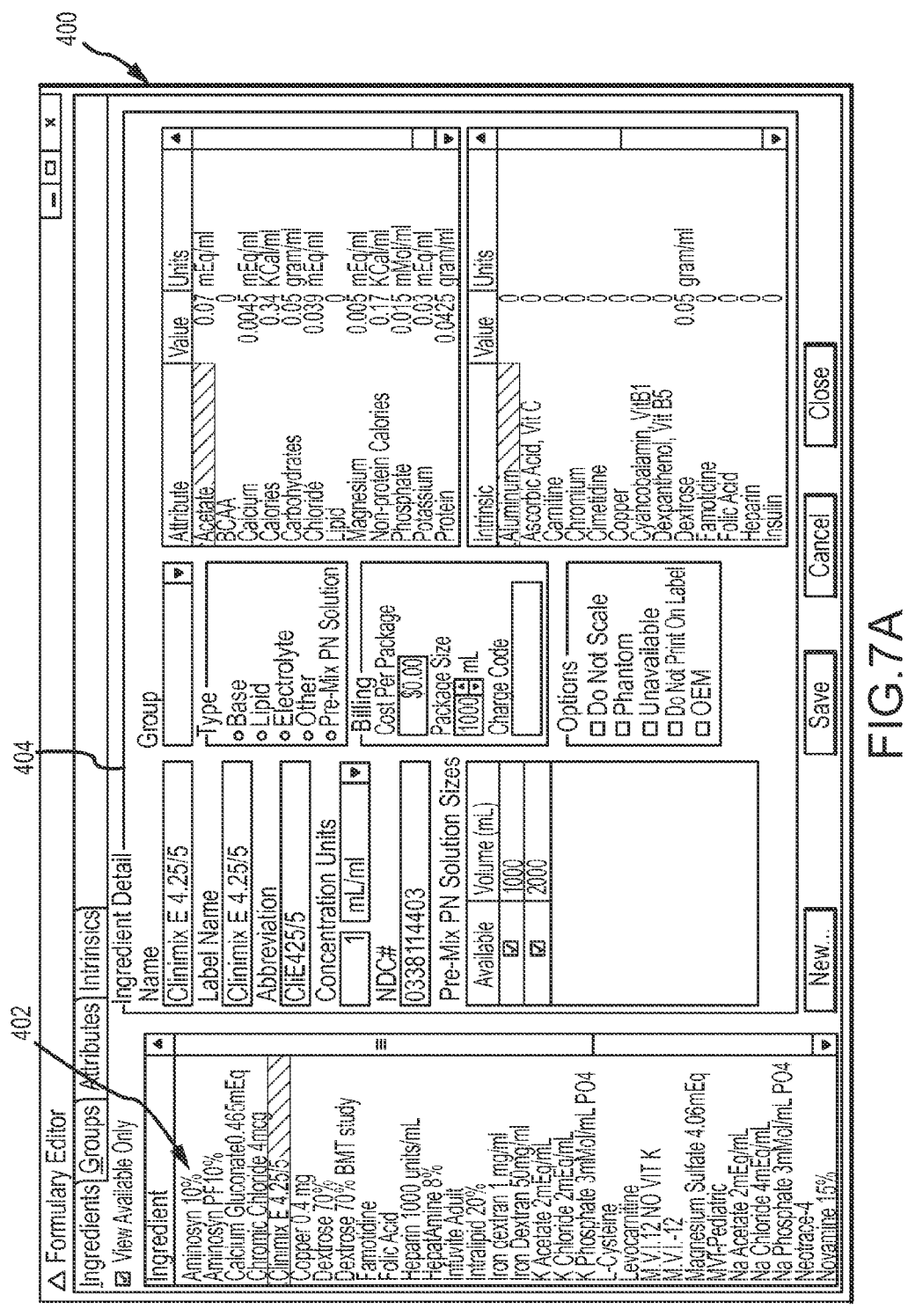
Figure 7B:
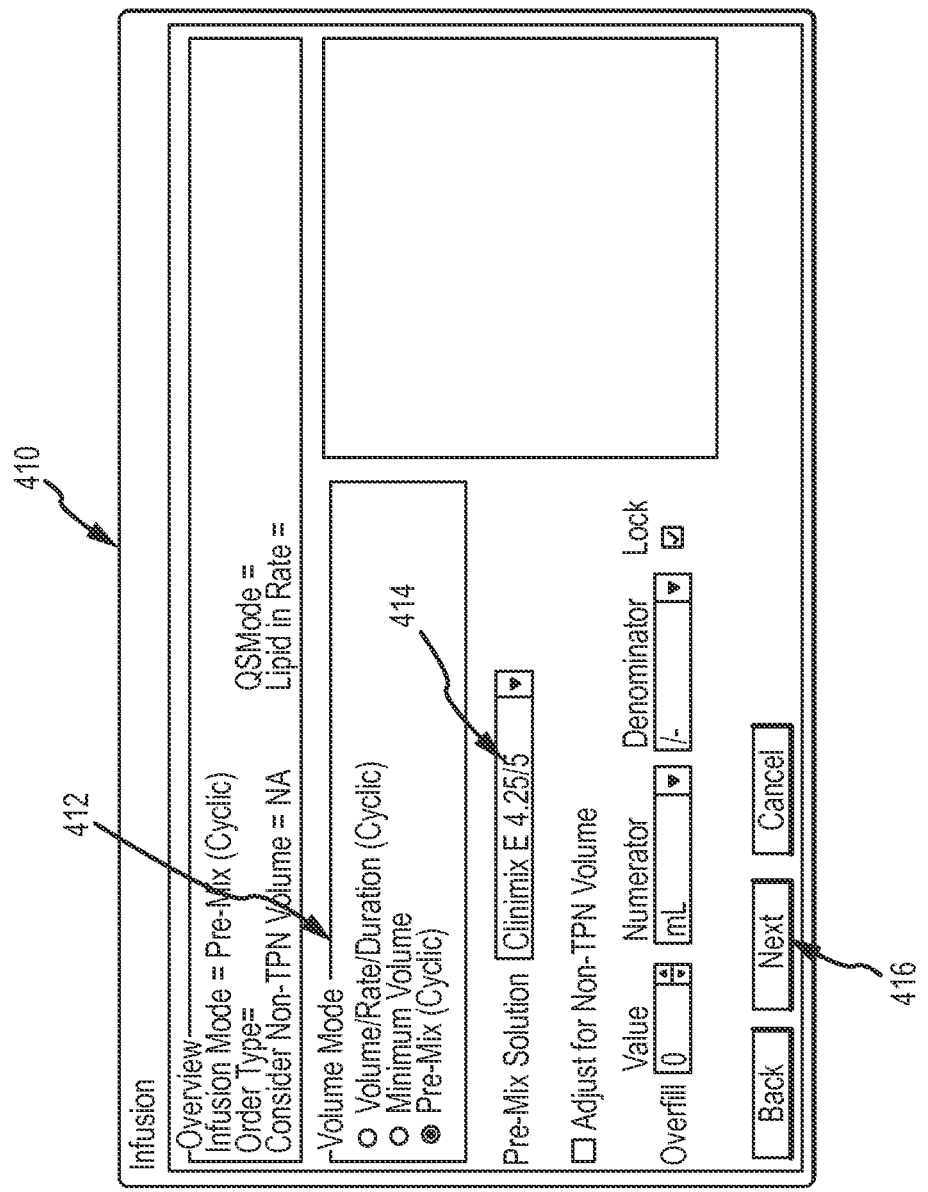
FIG. 7B illustrates an interactive user interface screen employable to initiate creation of a prescription order template for an order comprising a premix solution in an embodiment of a prescription order entry system of the present disclosure.

In some implementations, the preparation order generation and entry program(s) may facilitate the generation and entry of a preparation order that includes a premix solution 48 via the establishment and use of an order template that specifies the use of a given type of premix solution 48. For example, and as illustrated by FIG. 7B, interactive user interface screen 410 may be accessed by a user and an order type (e.g., entitled "Pre-Mix (Cyclic)") may be selected from an order type listing 412. In conjunction with such selection, a user may select a given type of premix solution 48 comprising formulary 56 utilizing scrollable selection box 414. For example, if a user desires to establish an order template for a preparation order utilizing a premix solution type having a premix solution identifier 50 (e.g., "CLINIMIX E 4.25/5" in the illustrated example), the user may utilize box 414 to select such premix solution type then utilize the "Next" button 416 to access one or more additional interactive user interface screens to establish additional infusion parameters (e.g., volume, rate, parameters; 2-in-1 or 3-in-1 parameters), and to access interactive user interface screen 420, shown in FIG. 7C to complete the order template.

The interactive user interface screen 420 may be utilized to name a given order template via user input box 422 and to identify and/or modify amounts of certain items for inclusion in a given order template via scrollable listing box 424. Note that listing box 424 includes the given premix solution identifier 50 corresponding with the given order template (e.g., "CLINIMIX E 4.25/5" in the illustrated example). As shown, selected ones of the items in listing box 424 may be locked to preclude modification of such items during subsequent use of the order template, including for example the corresponding premix solution identifier 50. As further illustrated, amounts may be set forth for certain items in the listing corresponding with compounds contained within the corresponding given premix solution 48 (e.g., amounts of sodium potassium, calcium, magnesium and phosphate in the illustrated example). As indicated, in addition to such included items, additional ingredients, or additions, may be included in the order template (e.g., by accessing a formulary listing via interactive use of button 426 (e.g., the additions of "M.V.I.-12" and "Trace Elements" in the illustrated example). Further, amounts of such additions may be established in the order template via interactive use of listing box 424 (e.g., for clicking upon an adjacent cell and entering a value). When a user has completed, or established, a given order template, such order template may be saved for subsequent use in conjunction with a given specific preparation order via use of interactive button 428.

In this regard, the prescription order entry program(s) may be provided so that one or more user interface screens may be accessed by a user to select a given one of one or a plurality of pre-established order templates, wherein a user may select an order template that includes a premix solution identifier 50 that corresponds with a type of premix solution 48 includable for use in one or more corresponding bag volumes (e.g., 1 L and/or 2 L). By way of example, and in relation to the exemplary formulary shown in the interactive user interface screen 400 of FIG. 7A and exemplary order template shown in the user interface screen 420 of FIG. 7C, reference is now made to FIG. 7D.

Figure 7D:
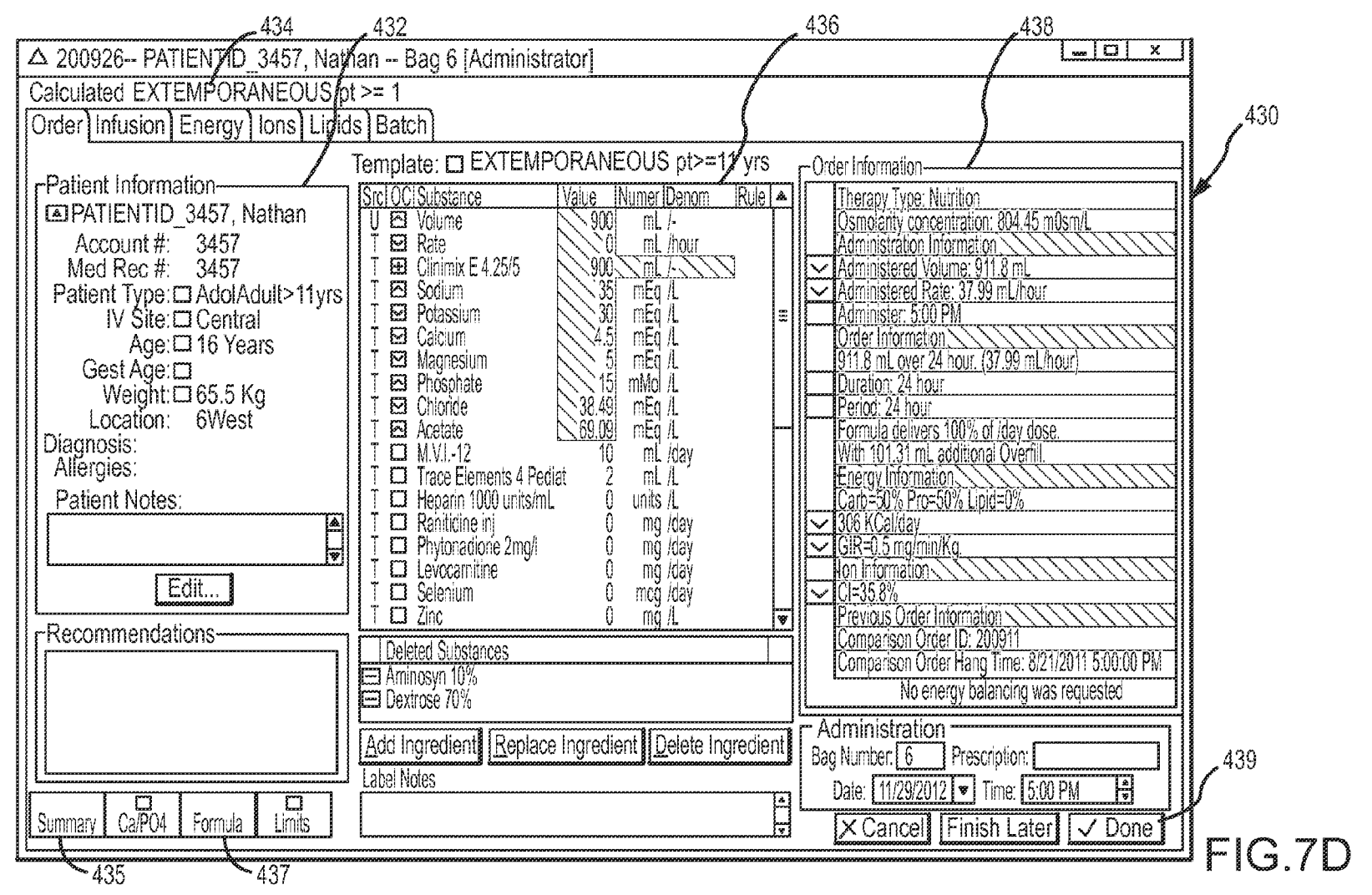

FIG. 7D illustrates an interactive user interface screen 430 displaying an order template accessed for use in generation and entry of a given preparation order (e.g., for a given patient indicated in the "Patient Information" screen portion 432). Note that, the name of the order template being utilized may be displayed in display box 434. As shown, an interactive listing box 436 may be employed to establish a desired, or prescribed, amount of the corresponding premix solution 48 (i.e., corresponding with the premix solution identifier 50 established in the order template) to be administered in use of the corresponding fulfilled order. For example, a user may enter a "Volume" value, or "Rate" and "Duration" values via use of adjacent interactive cells, to establish the desired to-be-administered volume of the premix solution (e.g., 900 ml of CLINIMIX E 4.25/5 in the illustrated example).

The interactive listing box 436 may also be employed to modify amounts of ingredients, or additions, for inclusion in the order. In the illustrated example, the amounts of additions for "M.V.I.-12" (i.e., 10 ml/day) and "Trace Elements" (i.e., 2 ml/L) have not been modified in the order shown in FIG. 7D relative to the amounts of such additions included in the order template shown in FIG. 7C. The preparation order generation and entry program(s) may be provided so that the amounts of one or more of such additions may be automatically computed and increased in order formulation calculations to account for dilution. Such calculations may utilize the Partial Infusion Factor and Proportion Volume Calculation Techniques described hereinabove. In the illustrated example, a calculated amount of "M.V.I.-12" may be 11.11 ml (i.e., 1000 ml/900 ml×10 ml); and, since "Trace Elements" is specified with a volume-based denominator, a corresponding calculated volume of "Trace Elements" may be based on the desired volume (i.e., 900 ml), such that the calculated amount may be 2.00 ml (i.e., (900 ml/1000 ml×2 ml)×(1000 ml/900 ml)); to yield a total volume of 1013.11 ml.

The preparation order generation and entry program(s) may be provided so that upon entry of the desired volume of premix solution, one of a plurality of corresponding available bag types, or volumes, may be automatically selected for inclusion in the order. For example, in relation to the formulary example of FIG. 7A, for an order template employing "CLINIMIX E 4.25/5", the preparation order generation and entry program(s) may automatically select a corresponding premix solution bag having a volume of 1 L or a corresponding premix solution bag having a volume of 2 L. Such selection may entail a comparison of the desired volume of premix with one or more of the volumes corresponding with the volumes of the different bags available for inclusion in the order. In one approach, the desired volume may be compared with the volume of the smallest corresponding available bag (e.g., 1 L), wherein if the desired volume is smaller the smallest bag is selected, and if the desired volume is greater, a larger volume bag (e.g., 2 L) is selected (e.g., a bag having a volume that is greater than the desired volume).

Further, the preparation order generation and entry program(s) may be provided so as to automatically calculate an overfill volume in relation to a given order. Such overfill volume may be automatically calculated to include an amount equal to the difference between the desired volume of premix solution (e.g., 900 ml in the illustrated example) and the volume of the bag of the premix solution selected for inclusion in the order (e.g., 1000 ml in the illustrated example). Such overfill volume may be further automatically calculated to account for the volume of any additions (i.e., added ingredients) included in the order.

In this regard, the preparation order generation and entry program(s) may be provided so that interactive user interface screen 430 includes an "Order Information" portion 438 that provides order information to a user regarding the automatically calculated overfill volume, and regarding an automatically calculated volume of fluid that may be administered upon order fulfillment and use. For the order example shown in FIG. 7D, the user interface screen 430 indicates a calculated "Administered Volume" of 911.8 ml and a calculated "Overfill" volume of 101.31 ml. Such order information may be included in a manifest output corresponding with the order after entry, e.g., for use in compounding using a compounder 800 and/or inclusion in bag label generation/printing. In that regard, when a user is satisfied with the contents of a given order reflected by interactive user screen 430, the user may proceed to enter, or complete, the order by use of the interactive button 439.

In addition to the foregoing, a user may utilize interactive button 435 to access interactive user interface screen 440 shown in FIGS. 7E, 7F, and 7G. As shown in FIGS. 7E, 7F, and 7G, selectable tabs 442, 444, and 446 may be utilized to obtain various order content summaries, including a summary of the preparation order formula.

Figure 7H:
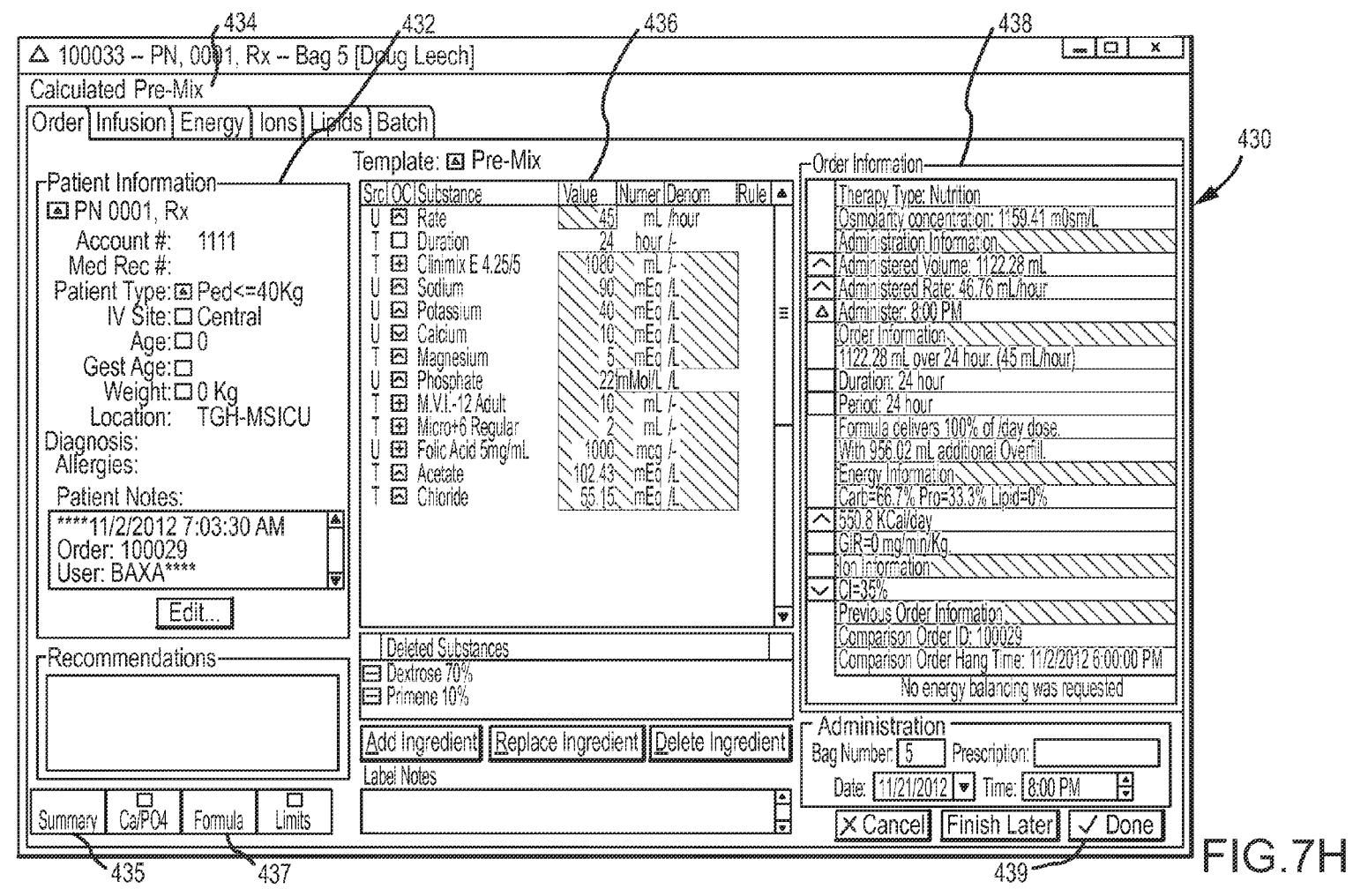

Reference is now made to FIG. 7H which illustrates interactive user screen 430 in relation to another exemplary order. In this example, a user has selected the use of a template that stipulates inclusion of a premix solution 48 identified as "CLINIMIX E 4.25/10". The user has further input a desired volume of the premix solution 48 by entering a "Rate" of 45 ml/hour and "Duration" of 24 hours. In turn, the preparation order generation and entry program(s) has automatically calculated a volume of the premix solution to be 1080 ml. In the illustrated example, the compound components of the premix are identified by unit amounts per liter (e.g., sodium, potassium, calcium, magnesium, and phosphate). In addition, the illustrated order reflects the inclusion of the following additions:

"MVI-12 Adult", "Micro+6 Regular", "Folic Acid 5 mg/ml", "Acetate", and "Chloride".

In conjunction with the generation of the order illustrated in FIG. 7H, the preparation order generation and entry program(s) may provide for the automatic selection of a two liter bag of the stipulated premix solution 48 corresponding with the order template utilized for order entry. In turn, to account for the difference between the ordered amount of premix solution (i.e., 1080 ml) and the volume of the bag (i.e., 2 L), included amounts of certain ones of the additions may automatically be increased by computational formula calculations to account for dilution effects. In particular, the automated formula calculations may increase the amounts of the following additions having specified unit amounts that are not based on amounts per unit volume:

"MVI-12 Adult", "Micro+6 Regular", and "Folic Acid 5 mg/ml".

Such calculations may utilize the Partial Infusion Factor and Proportion Volume Calculation Techniques described hereinabove.

As shown in the "Order Information" 438 portion of the interactive user screen 430 of FIG. 7E, the automatically calculated "Administered Volume" is 1122.28 ml, and the automatically calculated "Overfill Volume" to be included in the bag as formulated is 956.02 ml.

In conjunction with the exemplary order of FIG. 7H, the final calculated formulation amounts to be included in the order may be accessed by a user via use of the interactive button 437 entitled "Formula". Upon such interaction, a user may access the interactive user interface screen 440 shown in FIG. 7I. As shown in FIG. 7I, the final amounts of the given premix solution, compounds included therein, and additions thereto are listed. As may be appreciated, the information displayed in user interface screens 430 and 440 described above may be included on a manifest, or order output, for storage, inclusion on one or more labels, and/or for use in conjunction with compounding steps.

CONCLUSION

All references cited herein are incorporated herein by reference in their entirety and for all purposes to the same extent as if each individual publication or patent or patent application was specifically and individually indicated to be incorporated by reference in its entirety herein for all purposes.

Plural instances may be provided for components, operations or structures described herein as a single instance. Boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method for use of an automatic compounder for compounding a preparation corresponding to a requested therapy to be administered to a patient, the method comprising:
   receiving, at the compounder, a manifest corresponding to the preparation to be compounded, wherein the manifest comprises an indication of a receiving receptacle that contains a volume of at least a first component for inclusion in the preparation, and wherein the manifest comprises an indication of an amount of at least one additive to be added to the receiving receptacle;
   establishing fluid interconnection between a delivery port of the compounder and the receiving receptacle and between an input port of the compounder and an additive receptacle containing the additive to be added to the receiving receptacle, wherein the receiving receptacle comprises a prepackaged container containing the volume of at least the first component; and
   delivering, using a preprogrammed logic of the compounder, the amount of the additive from the additive receptacle to the receiving receptacle at least partially based on the manifest, wherein the preprogrammed logic of the compounder automatically controls flow from the input port to the delivery port;
   wherein the receiving receptacle comprises an administration receptacle from which the preparation is to be administered to the patient.

2. The method of claim 1, wherein the manifest comprises an indication of an amount for each of a plurality of additives to be added to the receiving receptacle.

3. The method of claim 2, wherein the establishing further comprises establishing fluid interconnection between a plurality of additive receptacles corresponding to the plurality of additives and a plurality of respective input ports of the compounder.

4. The method of claim 3, wherein the delivering further comprises selectively controlling flow from each of said plurality of input ports and the delivery port to deliver the amount of each of the plurality of additives at least partially based on the manifest.

5. The method of claim 4, further comprising:
   maintaining the fluid interconnection between the delivery port of the compounder and the receiving receptacle during the delivering of the amount of each of the plurality of additives.

6. The method of claim 5, wherein the establishing comprises a first fluid interconnection between the delivery port of the compounder and the receiving receptacle.

7. The method of claim 6, wherein the receiving receptacle comprises a premix solution comprising a parenteral nutrition (PN) solution.

8. The method of claim 2, further comprising sequencing, using the preprogrammed logic, the delivery of the plurality of additives to reduce interaction of potentially incompatible ingredients.

9. The method of claim 1, wherein the delivering is performed in an at least partially automated fashion by the compounder.

10. The method of claim 1 further comprising:
    receiving the receiving receptacle at a receptacle support of the compounder.

11. The method of claim 10, further comprising:
    measuring, at the compounder in response to receiving the receiving receptacle, at least one beginning physical property of the receiving receptacle prior to the delivering; and
    comparing, using the preprogrammed logic, the least one beginning physical property of the receiving receptacle measured by the compounder to an expected physical property for the receiving receptacle.

12. The method of claim 11, further comprising:
    analyzing, after the delivering using the preprogrammed logic, at least one ending physical property of the receiving receptacle that is determined at the compounder to an expected ending physical property, wherein the expected ending physical property is at least partially based on the beginning physical property and the plurality of amounts of additives.

13. The method of claim 10, further comprising:
obtaining, at the compounder, information indicative of the identity of the received receiving receptacle prior to the establishing.

14. The method of claim 13, wherein the obtaining includes reading, with the compounder, a machine readable indicia corresponding to the receiving receptacle.

15. The method of claim 13, wherein the machine readable indicia comprises one of an RFID tag or a bar code physically provided with the receiving receptacle.

16. The method of claim 15, wherein the machine readable indicia corresponding to the received receiving receptacle is compared, using the preprogrammed logic, to the indication of the receiving receptacle from the manifest to verify a received receiving receptacle corresponds to the indication of the receiving receptacle.

17. The method of claim 10 further comprising:
prompting a user to locate the receiving receptacle at the receptacle support and establish fluid interconnection between the receiving receptacle and the delivery port.

18. The method of claim 1, wherein the receiving of the manifest comprises accepting inputs from a user by way of manual user inputs at a user interface at the compounder.

19. The method of claim 1, wherein the receiving of the manifest comprises obtaining a manifest output corresponding to the preparation as machine readable data.

20. The method of claim 19, wherein the manifest output is automatically generated based on a first selection corresponding to a premix solution and a second selection corresponding to the additive.

21. The method of claim 1, wherein the delivery comprises adding from about 0.1 ml of the additive to the receiving receptacle to about 750 ml of the additive to the receiving receptacle.

22. The method of claim 1, wherein the receiving step further comprises:
generating the manifest.

23. A method for use of an automatic compounder for compounding a preparation corresponding to a requested therapy to be administered to a patient, the method comprising:
receiving, at the compounder, a manifest corresponding to the preparation to be compounded, wherein the manifest comprises an indication of a receiving receptacle that contains a volume of at least a first component for inclusion in the preparation, and wherein the manifest comprises an indication of an amount of at least one additive to be added to the receiving receptacle;
establishing fluid interconnection between a delivery port of the compounder and the receiving receptacle and between an input port of the compounder and an additive receptacle containing the additive to be added to the receiving receptacle, wherein the receiving receptacle comprises a prepackaged container containing the volume of at least the first component;
delivering, using a preprogrammed logic of the compounder, the amount of the additive from the additive receptacle to the receiving receptacle at least partially based on the manifest, wherein the preprogrammed logic of the compounder automatically controls flow from the input port to the delivery port; and
generating the manifest, wherein the generating comprises:
receiving a first selection of a premix solution from a plurality of premix solutions and an ordered amount of the premix solution, wherein the first selection of the premix solution corresponds to the receiving receptacle, and wherein each respective one of the premix solutions includes a predetermined description at least comprising:
(i) an identifier for the respective premix solution,
(ii) a volume of the respective premix solution in a prepackaged bag containing the premix solution, and
(iii) an amount of at least a first component in the respective premix solution contained in the prepackaged bag;
receiving a second selection, wherein the second selection includes a first amount of an additive from a plurality of additions, wherein the plurality of additions are predefined in a formulary comprising at least one formulary concentration for each respective addition in the plurality of additions; and
determining the amount for the first additive to be added to be added to the receiving receptacle at least partially based on the ordered amount, the volume of the premix solution in the prepackaged bag, the first amount, and the formulary concentration for the first additive.

24. The method of claim 23, wherein the ordered amount is less than the volume of the premix solution in the prepackaged bag, wherein the method further comprises:
calculating a partial infusion factor based on the ordered amount and the volume of the premix solution in the prepackaged bag;
wherein the additive volume is at least partially based on the partial infusion factor.

* * * * *